United States Patent
Hanafusa et al.

(10) Patent No.: US 11,092,575 B2
(45) Date of Patent: Aug. 17, 2021

(54) PRETREATMENT DEVICE, AND ANALYSIS SYSTEM PROVIDED WITH SAME

(71) Applicant: SHIMADZU CORPORATION, Kyoto (JP)

(72) Inventors: Nobuhiro Hanafusa, Kyoto (JP); Kazuhiro Suzuki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 323 days.

(21) Appl. No.: 15/741,789

(22) PCT Filed: Jul. 9, 2015

(86) PCT No.: PCT/JP2015/069736
§ 371 (c)(1),
(2) Date: Feb. 28, 2018

(87) PCT Pub. No.: WO2017/006476
PCT Pub. Date: Jan. 12, 2017

(65) Prior Publication Data
US 2018/0196016 A1    Jul. 12, 2018

(51) Int. Cl.
*G01N 30/06*    (2006.01)
*B01L 9/00*    (2006.01)
(Continued)

(52) U.S. Cl.
CPC ......... *G01N 30/06* (2013.01); *G01N 35/0092* (2013.01); *G01N 35/02* (2013.01);
(Continued)

(58) Field of Classification Search
None
See application file for complete search history.

(56) References Cited

U.S. PATENT DOCUMENTS

| 2007/0264655 | A1 | 11/2007 | Netsu |
| 2011/0157580 | A1 | 6/2011 | Nogami et al. |
| 2013/0295597 | A1* | 11/2013 | DeWitte ................. G01N 30/06 435/23 |

FOREIGN PATENT DOCUMENTS

| JP | 63-208765 A | 8/1988 |
| JP | 08-313537 A | 11/1996 |

(Continued)

OTHER PUBLICATIONS

Communication dated Nov. 12, 2018, from the Japanese Patent Office in counterpart application No. 2017-527048.

(Continued)

*Primary Examiner* — Kathryn Wright
(74) *Attorney, Agent, or Firm* — Sughrue Mion, PLLC

(57) ABSTRACT

Provided are a pretreatment device capable of starting pretreatment in a simple operation, and an analysis system provided with the pretreatment device. A container holding unit 12 holds pretreatment containers into each of which a sample is injected, at a plurality of holding positions. A pretreatment unit sequentially performs pretreatment by using the pretreatment containers held at the holding positions of the container holding unit 12 in a specific order. A controller configured to receives a setting of the holding position of a pretreatment container to be used first among the plurality of holding positions in the case where a series of pretreatments using the plurality of pretreatment containers is started by the pretreatment unit.

5 Claims, 16 Drawing Sheets

(51) Int. Cl.
  *G01N 35/04*     (2006.01)
  *G01N 35/02*     (2006.01)
  *G01N 35/00*     (2006.01)
  *G01N 30/72*         (2006.01)
  *G01N 30/02*         (2006.01)

(52) U.S. Cl.
  CPC ....... *G01N 30/7233* (2013.01); *G01N 35/025* (2013.01); *G01N 35/04* (2013.01); *G01N 2030/027* (2013.01); *G01N 2030/067* (2013.01)

(56) References Cited

FOREIGN PATENT DOCUMENTS

| | | |
|---|---|---|
| JP | 11-160324 A | 6/1999 |
| JP | 2001-004638 A | 1/2001 |
| JP | 2006-84367 A | 3/2006 |
| JP | 2007-303867 A | 11/2007 |
| JP | 2010-060474 A | 3/2010 |

OTHER PUBLICATIONS

International Search Report of PCT/JP2015/069736 dated Sep. 29, 2015.

\* cited by examiner

[FIG. 1]
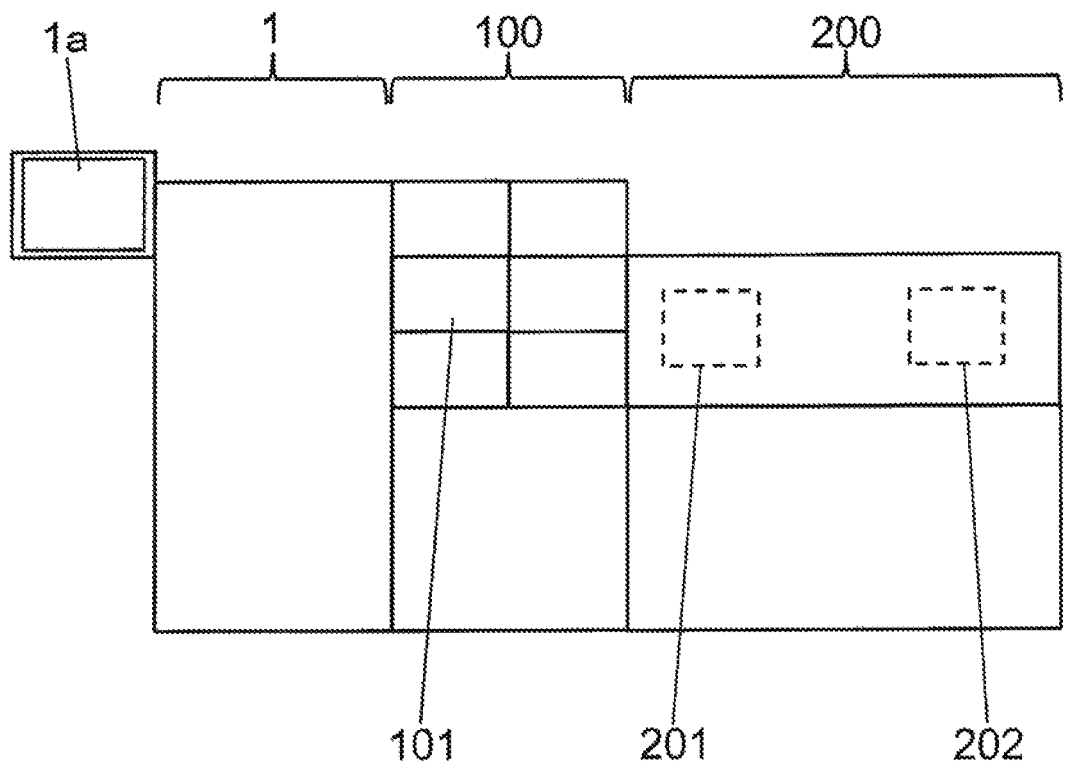

[FIG. 2]
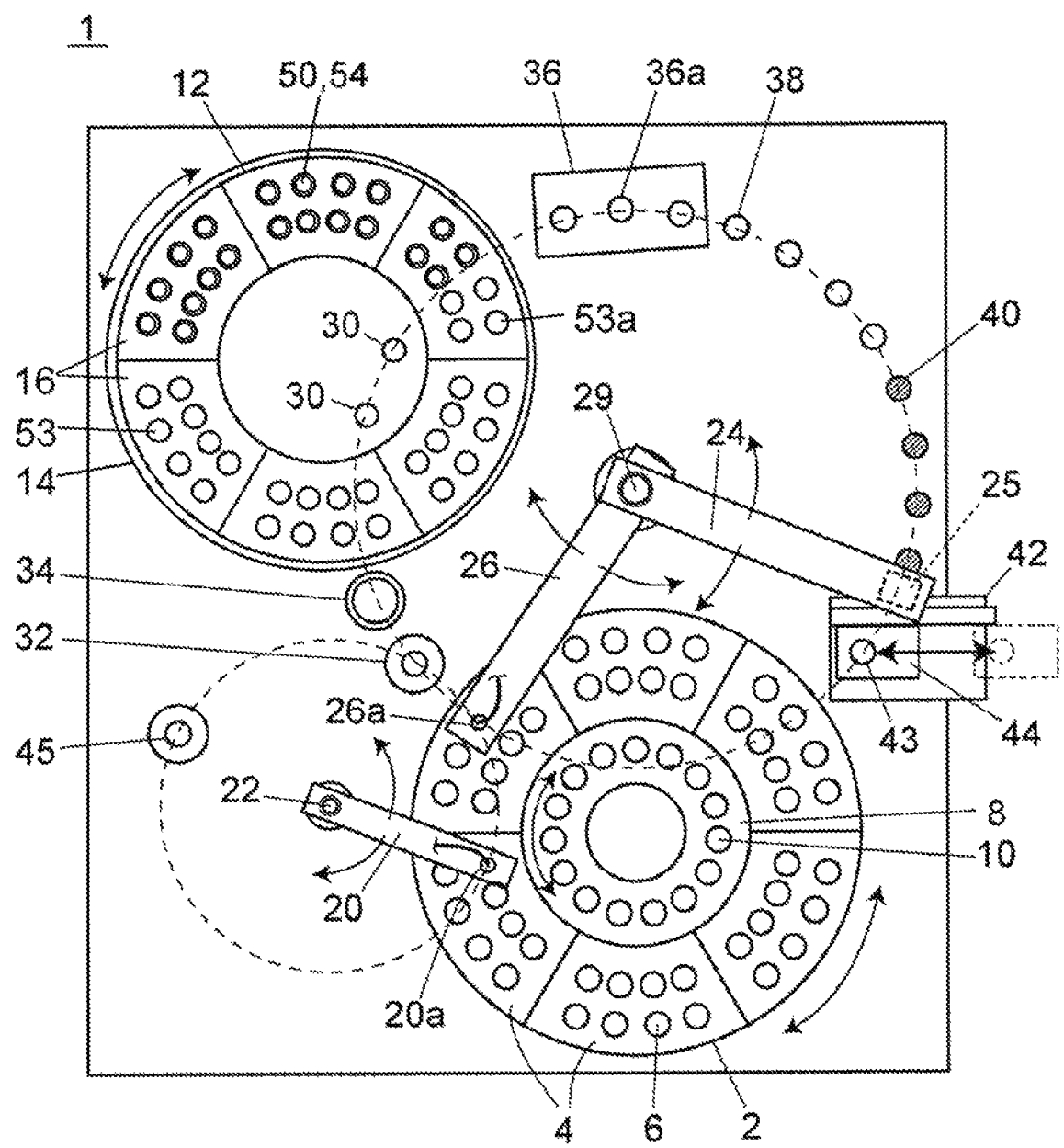

[FIG. 3A]
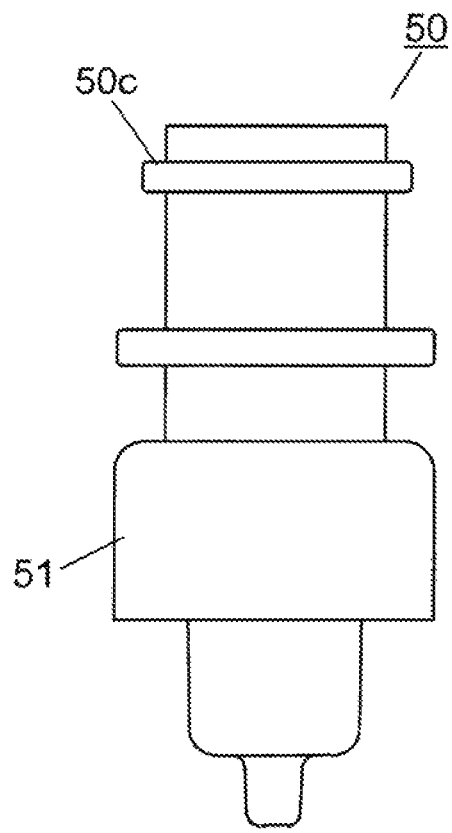
[FIG. 3B]
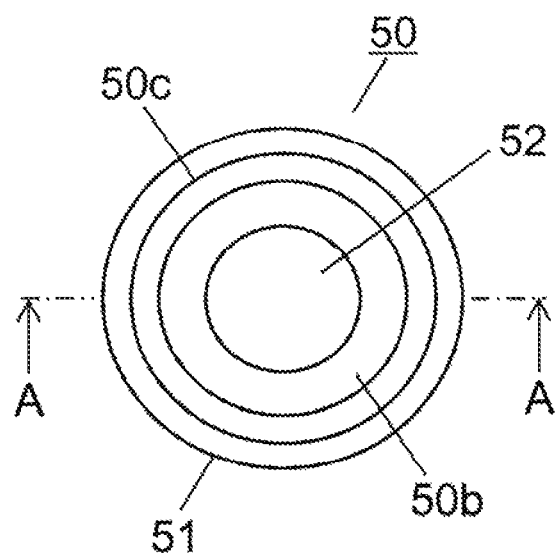

[FIG. 3C]
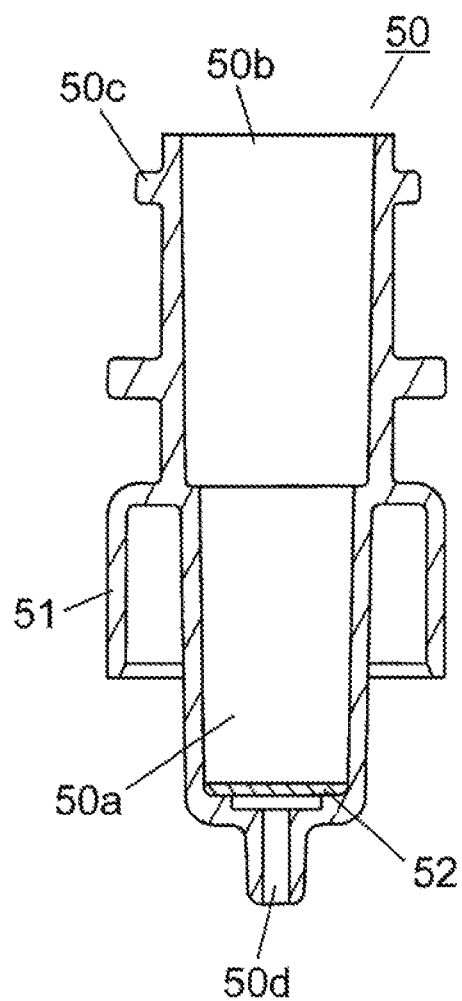

[FIG. 4A]
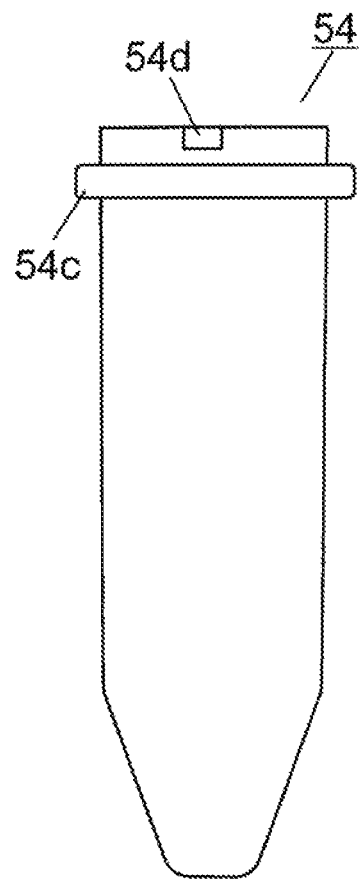
[FIG. 4B]
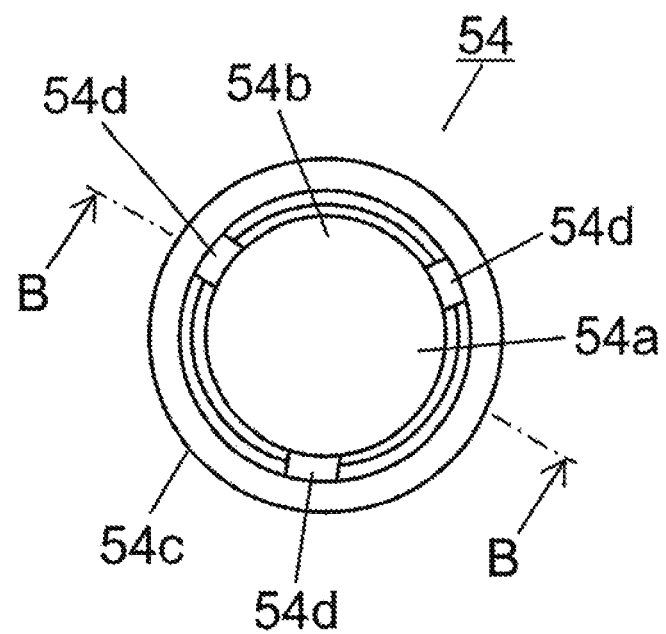

[FIG. 4C]
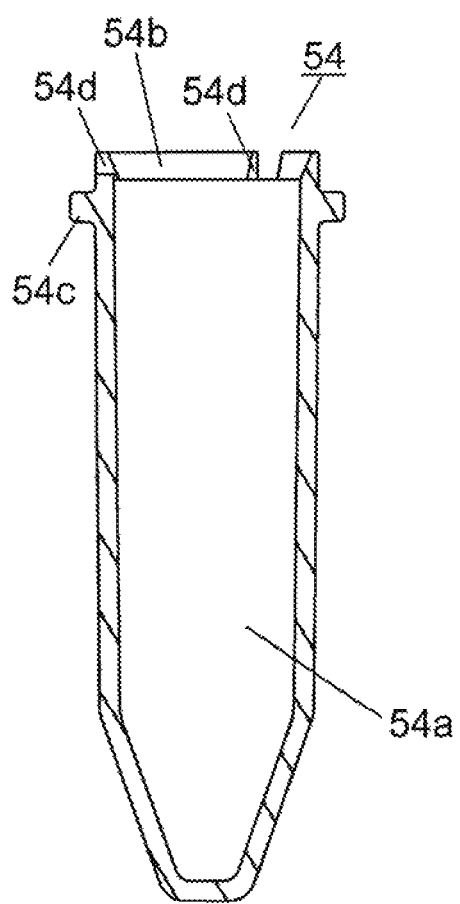

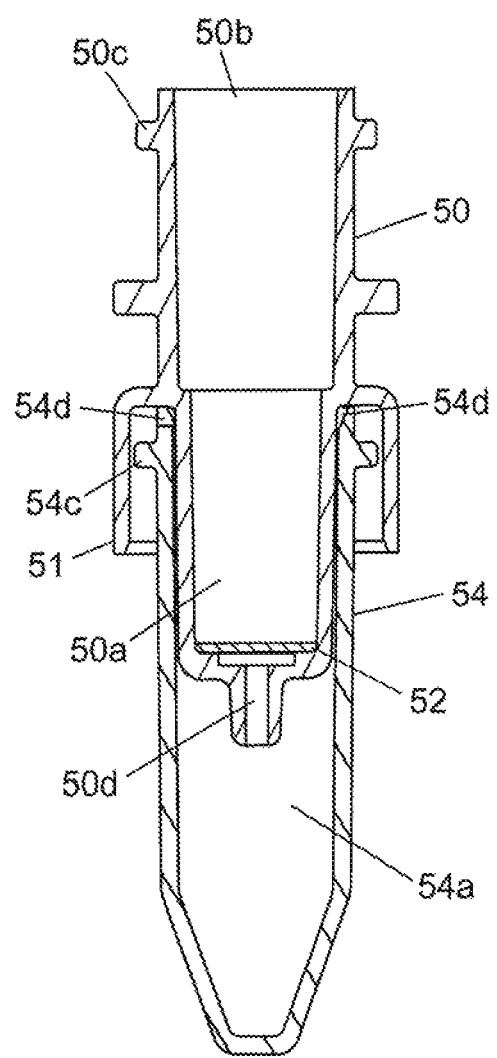
[FIG. 5]

[FIG. 6A]
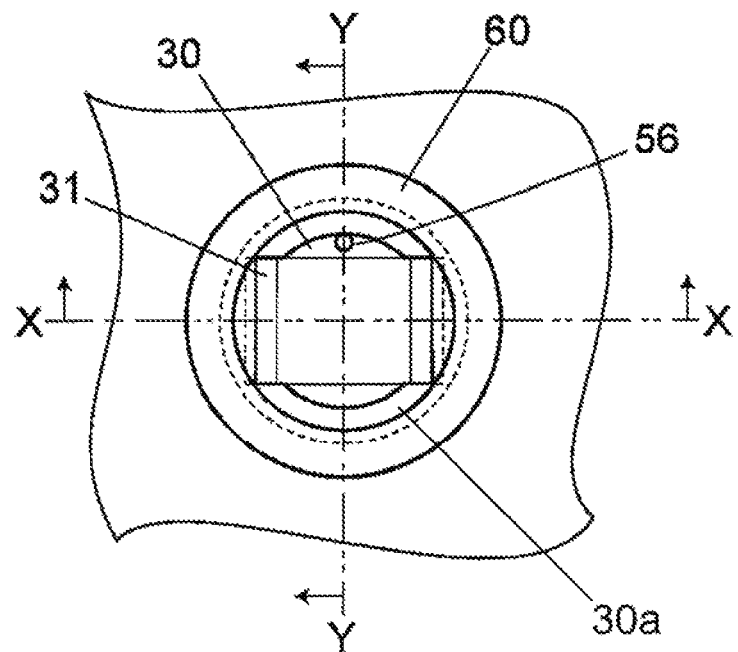
[FIG. 6B]
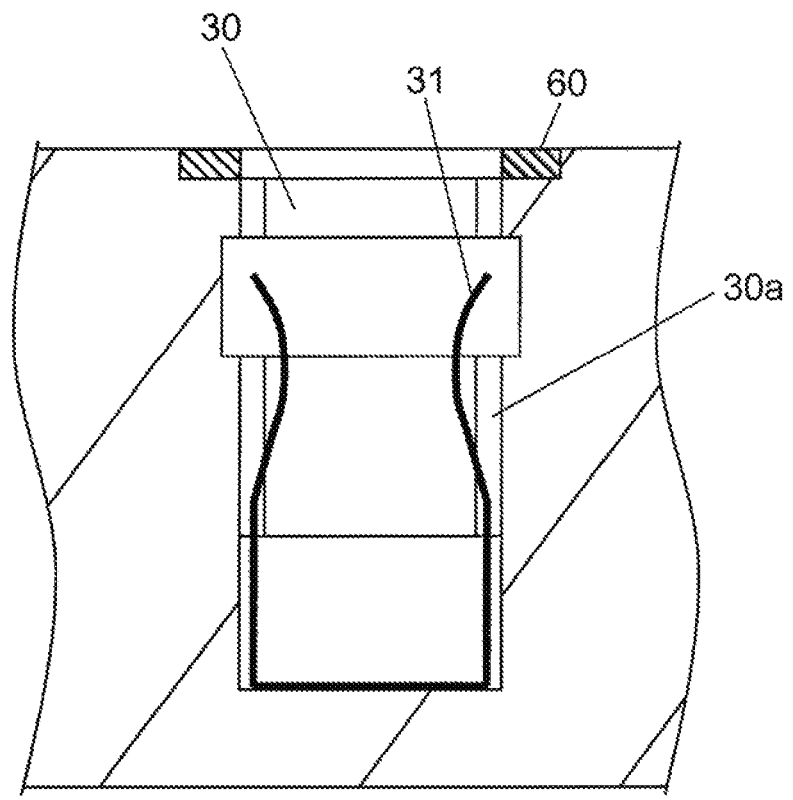

[FIG. 6C]
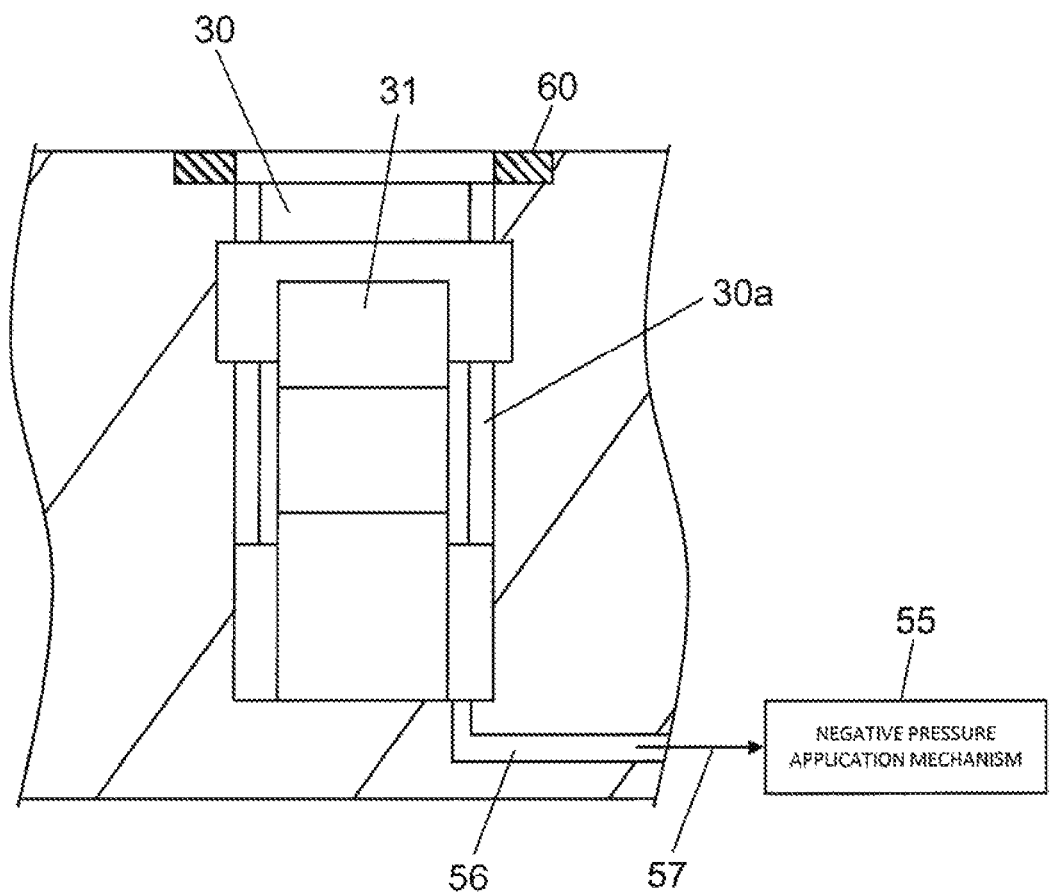

[FIG. 6D]
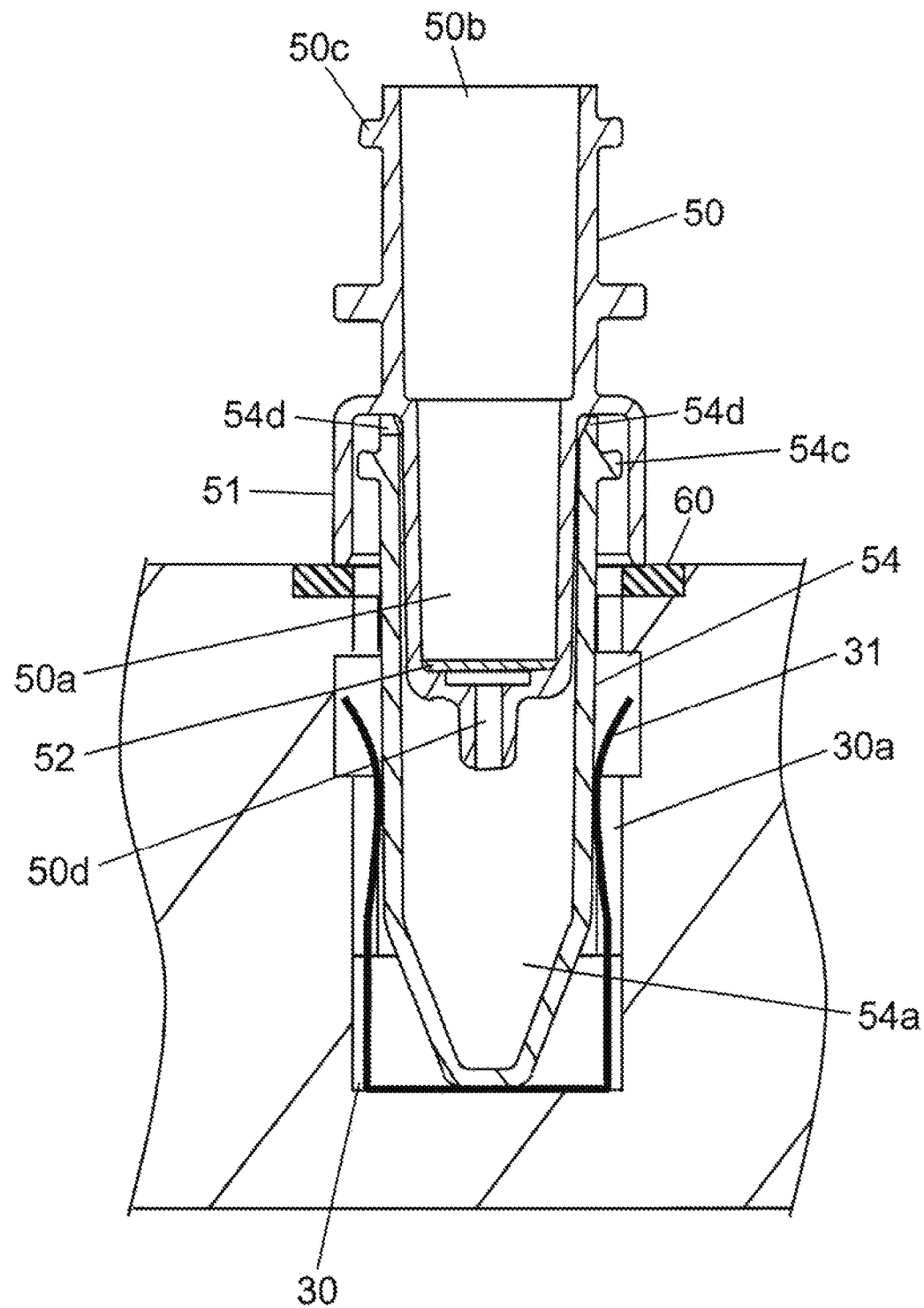

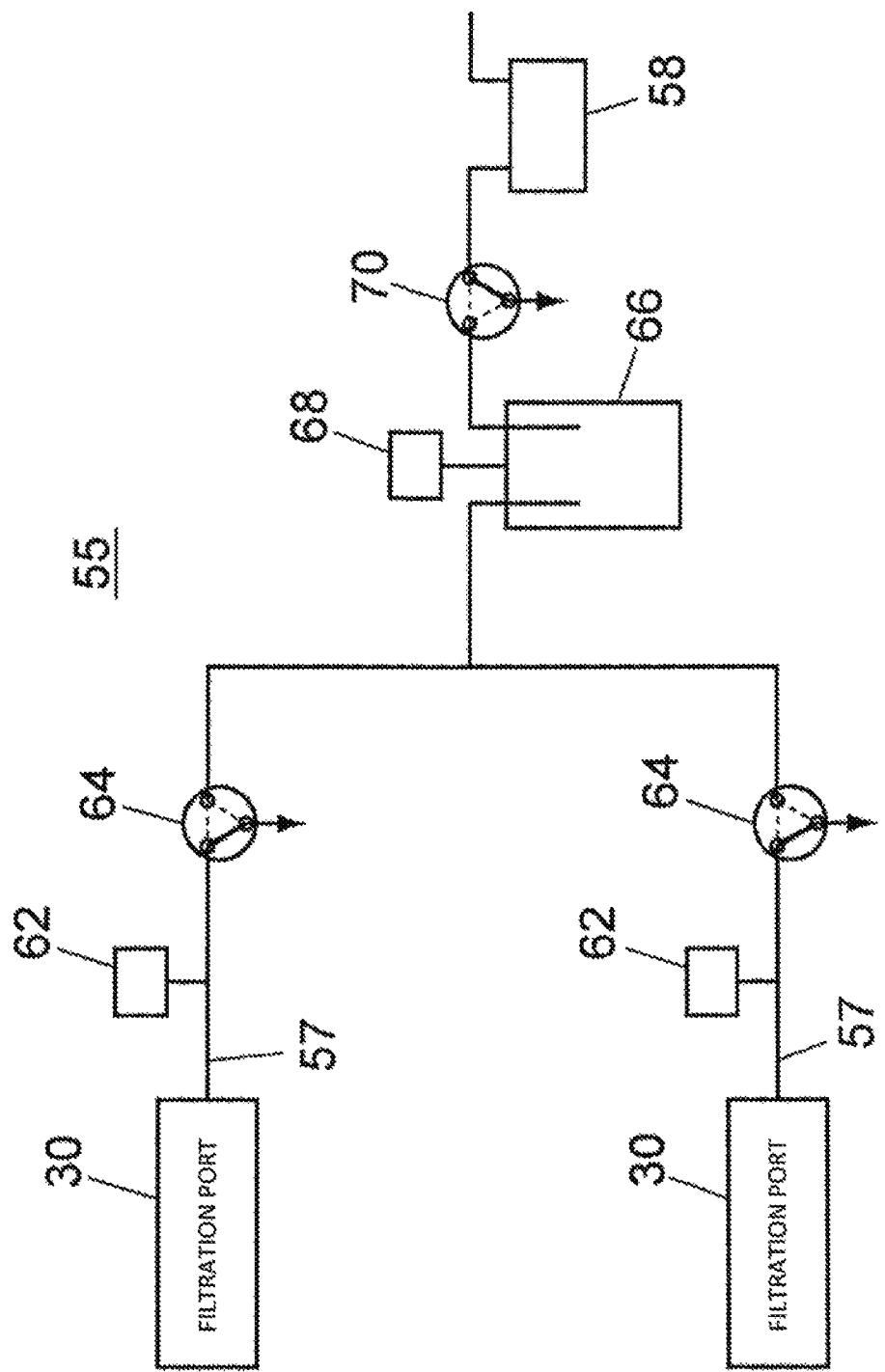
[FIG. 7]

[FIG. 8]
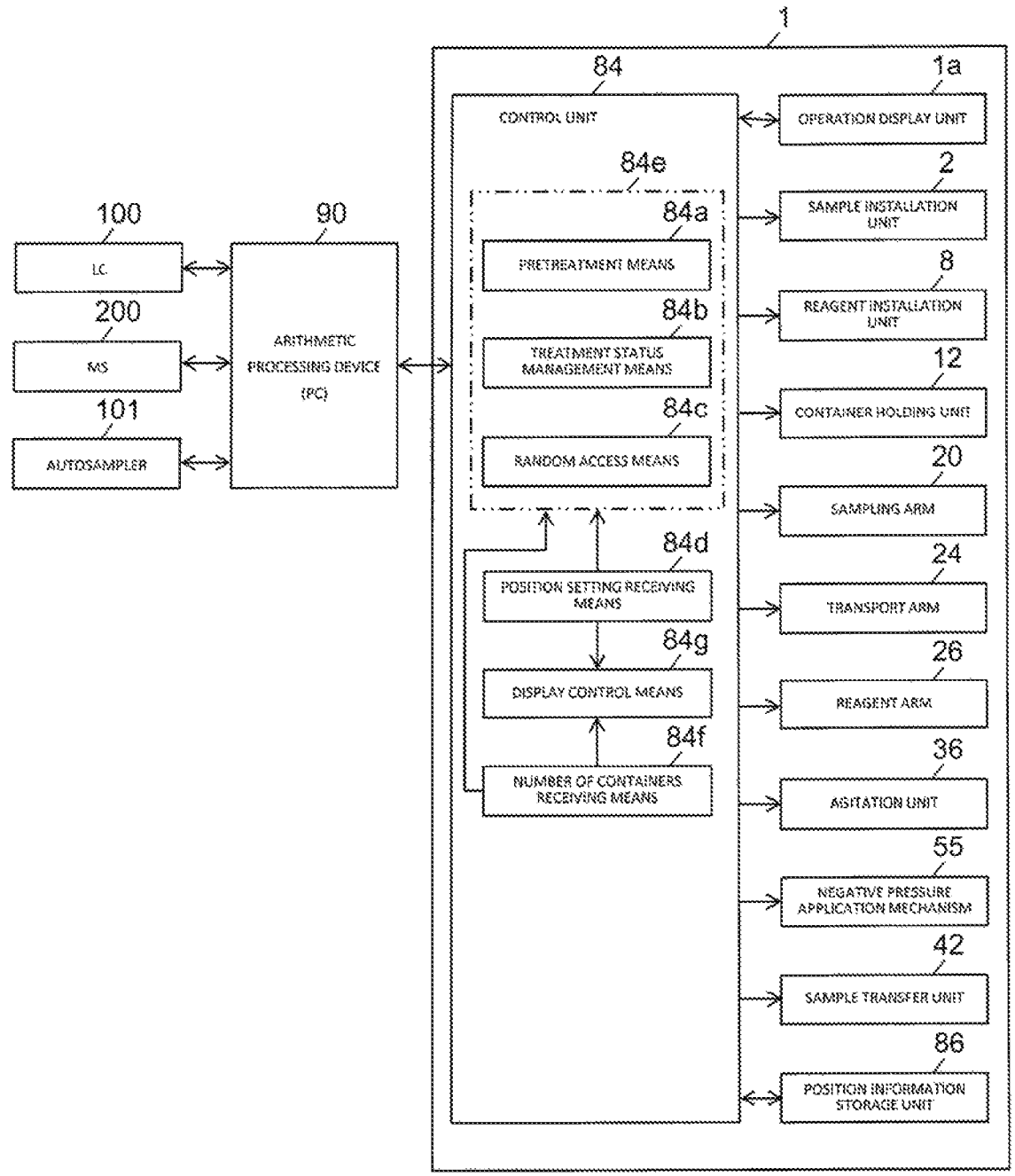

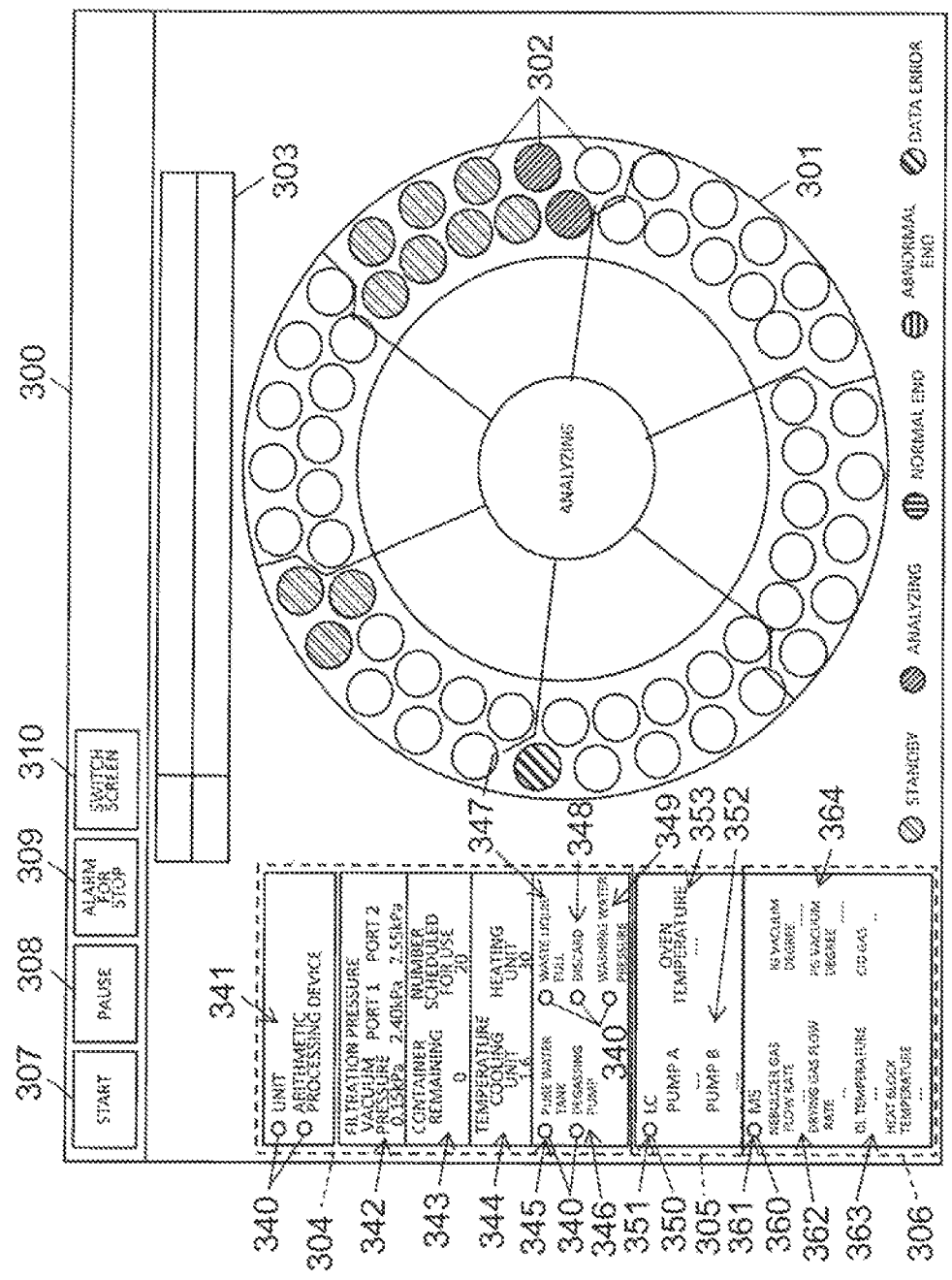
[FIG. 9A]

[FIG. 9B]
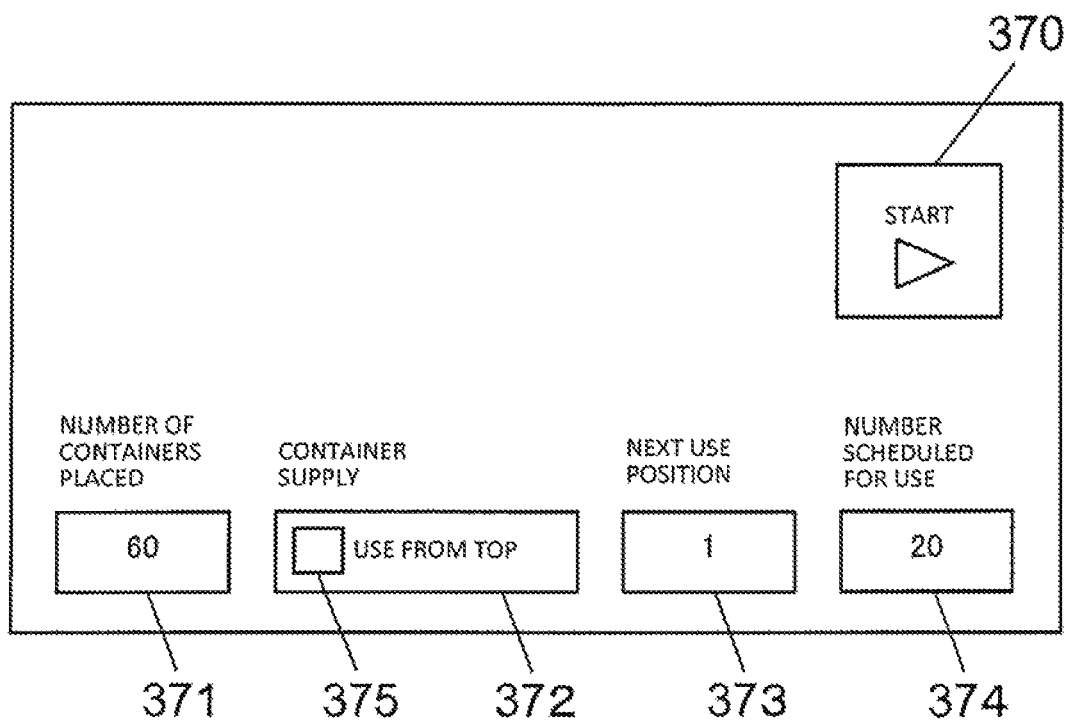

[FIG. 10A]
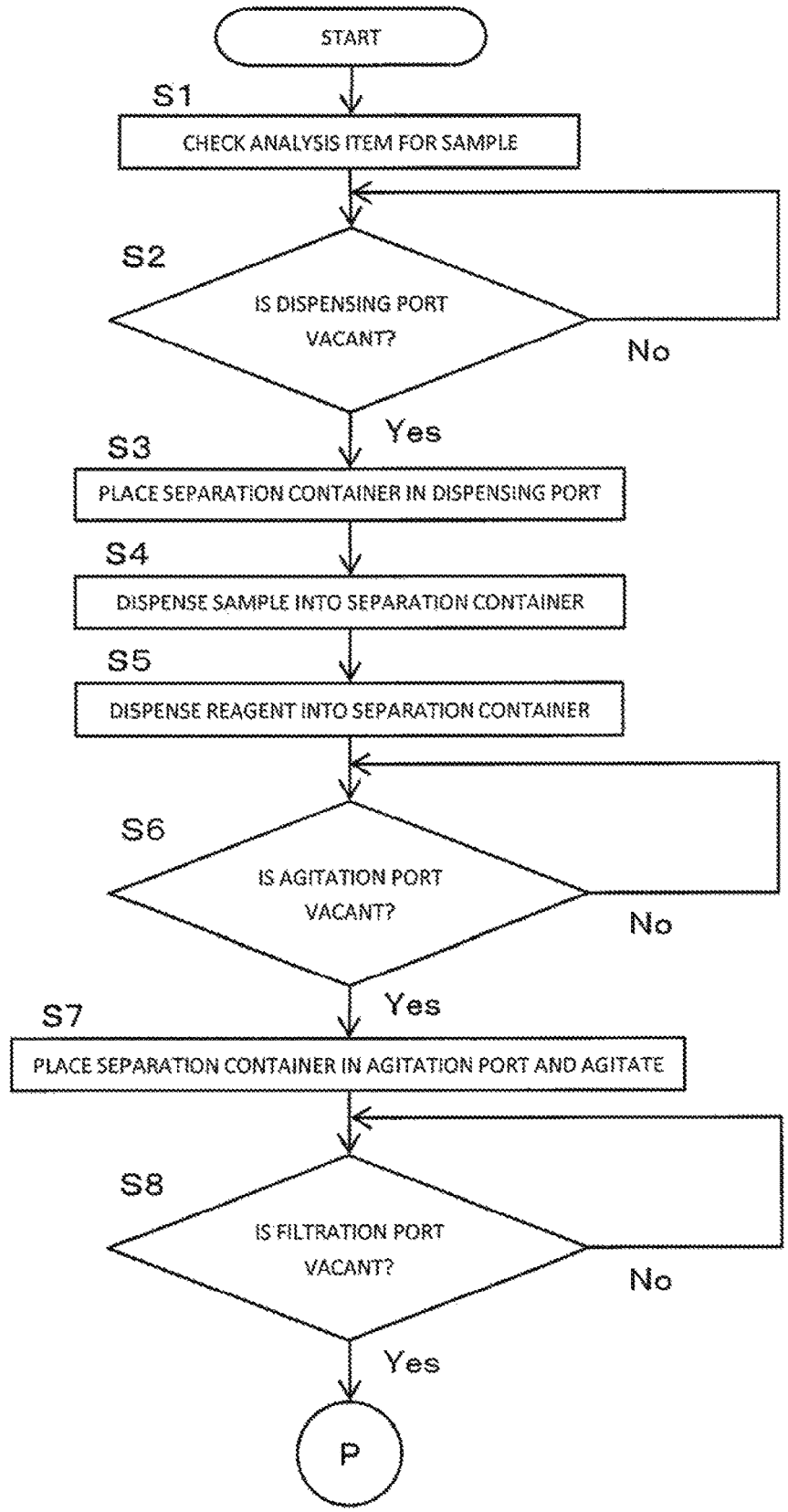

[FIG. 10B]
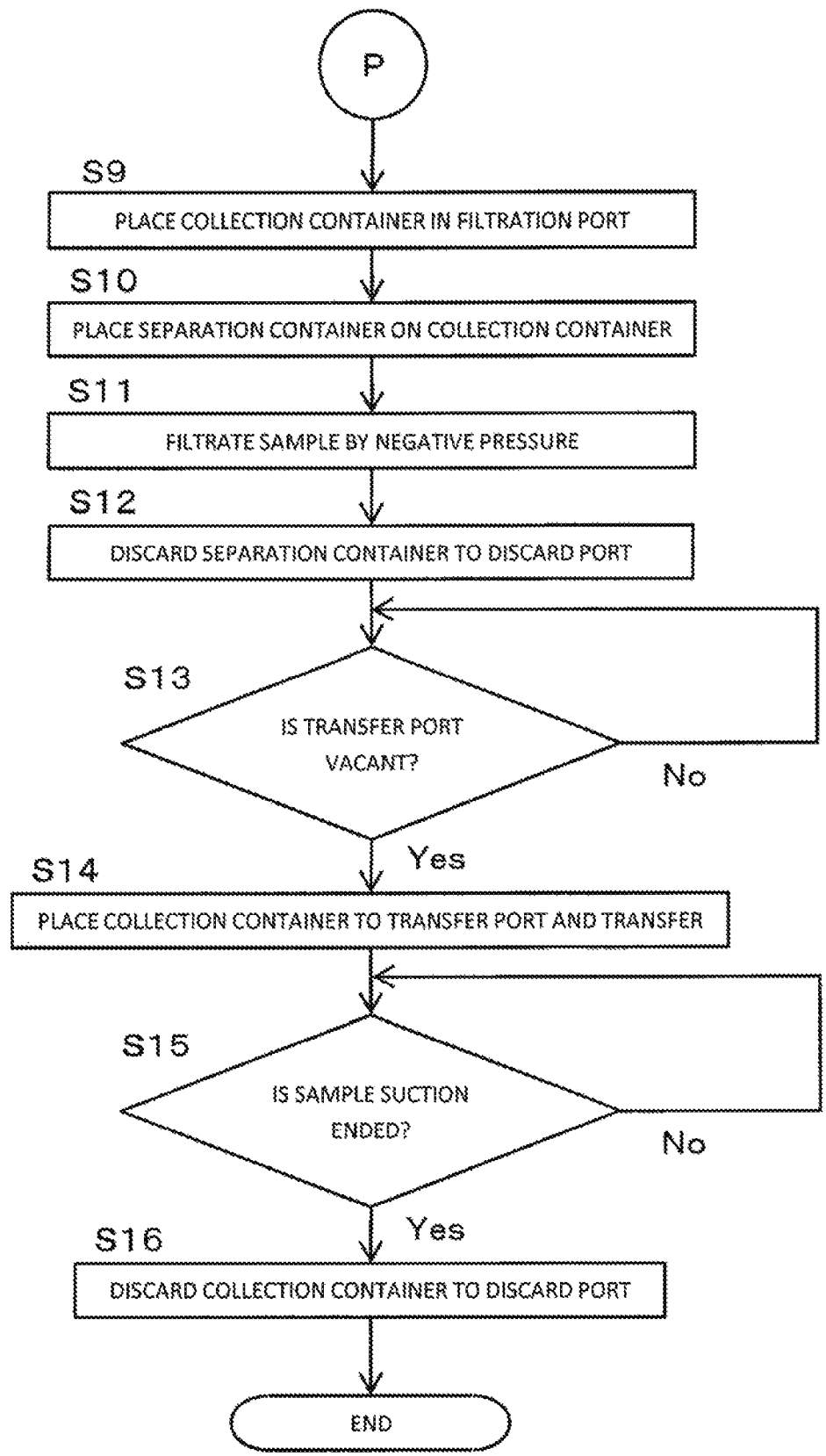

PRETREATMENT DEVICE, AND ANALYSIS SYSTEM PROVIDED WITH SAME

CROSS REFERENCE TO RELATED APPLICATIONS

This application is a National Stage of International Application No. PCT/JP2015/069736 filed Jul. 9, 2015.

TECHNICAL FIELD

The present invention relates to a pretreatment device for performing pretreatment on a sample.

BACKGROUND ART

For example, at the time of analyzing a component contained in a sample of biological origin, such as whole blood, blood serum, a dried blood spot or urine, analysis is sometimes performed after pretreating the sample by a pretreatment device. Examples of the pretreatment may include a process of removing a specific component unnecessary for analysis from the sample and extracting a necessary component, and a process of concentrating or drying an extracted sample. As a pretreatment device for automatically performing such pretreatment, various configurations have been conventionally proposed (see, for example, Patent Document 1 below).

For example, Patent Document 1 discloses a configuration in which a plurality of cartridges (separation containers) are held and transported by a common transport mechanism, each cartridge containing a separation agent through which a specific component in a sample is separated. The plurality of cartridges are sequentially transported by the transport mechanism to a pressure application mechanism provided at a predetermined position, and a sample is extracted by application of pressure by the pressure application mechanism. A plurality of receiving tray containers (collection containers) for receiving extracted liquid from the cartridges are transported, at below the cartridges, by a transport mechanism different from that of the cartridges, and extraction of samples is continuously performed.

PRIOR ART DOCUMENT

Patent Document

Patent Document 1: JP 2010-60474 A

SUMMARY OF THE INVENTION

Problems to be Solved by the Invention

In this type of pretreatment device, pretreatment containers (cartridges) into which a sample is injected are held at a plurality of holding positions in the device, and these pretreatment containers are used in a specific order, to thereby sequentially perform pretreatment. The used pretreatment container is automatically discarded and at completion of analysis, the pretreatment containers at all the holding positions are discarded or the pretreatment containers at some of the holding positions are held.

When the next analysis starts, a pretreatment container is newly replenished to the holding position where no pretreatment container is held, thereby resulting in a state where the pretreatment containers are held at all the holding positions. Thereafter, when an analysis start operation is performed, the pretreatment containers are sequentially used from one held at a specific holding position (forwardmost holding position) among the plurality of holding positions, and a series of pretreatments is carried out.

In this manner, with the conventional pretreatment device, an operation of replenishing a pretreatment container needs to be performed before start of analysis. Therefore, for example, even though a relatively small number of pretreatment containers are used to perform analysis and thereafter, the number of pretreatment containers used for analysis to be performed next is sufficient, a pretreatment container needs to be replenished before analysis is started, so that the operation is complicated.

The present invention has been achieved under such circumstances, and its object is to provide a pretreatment device capable of starting pretreatment in a simple operation, and an analysis system provided with the same.

Means for Solving the Problems

The pretreatment device according to the present invention is a pretreatment device for performing pretreatment on a sample and includes a container holding unit, a pretreatment unit, and a position setting receiving unit. The container holding unit holds pretreatment containers into each of which a sample is injected, at a plurality of holding positions. The pretreatment unit sequentially performs pretreatment by using the pretreatment containers held at the holding positions in the container holding unit in a specific order. The position setting receiving unit receives setting of the holding position of a pretreatment container to be used first among the plurality of holding positions in the case where a series of pretreatments using the plurality of pretreatment containers is started by the pretreatment unit.

According to the configuration, in the case where such a series of pretreatments using the plurality of pretreatment containers is started, it is not limited to the pretreatment container held at a specific holding position among the plurality of holding positions, and a pretreatment container held at the other holding position may be used first to carry out a series of pretreatments. Therefore, when the holding position where the pretreatment container is held is set as a holding position of the pretreatment container to be used first, a series of pretreatments is allowed to be started without performing the operation of replenishing a pretreatment container. Accordingly, the pretreatment can be started in a simple operation.

The pretreatment device may further include a position information storage unit for storing information about the holding position of the pretreatment container used last when a series of pretreatments by the pretreatment unit is completed. In this case, the position setting receiving unit may receive a setting of whether or not to determine the holding position of the pretreatment container to be used first based on the information stored in the position information storage unit.

According to the configuration, in the case where a series of pretreatments using a plurality of pretreatment containers is started, it is possible to automatically set the holding position where the pretreatment container is held as a holding position of the pretreatment container to be used first, based on the information about the holding position of the pretreatment container used last during the previous pretreatment. Therefore, the pretreatment can be started in a simpler operation in cases, as for example where a series of pretreatments is started without performing the operation of replenishing a pretreatment container.

The position setting receiving unit may receive a setting of whether or not to determine a specific holding position among the plurality of holding positions as the holding position of the pretreatment container to be used first.

According to the configuration, in cases, as for example where a series of pretreatments is started after the operation of replenishing a pretreatment container, a specific holding position among the plurality of holding positions may be determined as the holding position of the pretreatment container to be used first. When a pretreatment container is replenished, a pretreatment container held at any of the holding positions may be used first, so that the pretreatment container held at a specific holding position is used first to thereby simplify the operation during the pretreatment.

The pretreatment device may further include the number of containers receiving unit for receiving input of the number of pretreatment containers held by the container holding unit.

According to the configuration, in cases, as for example where a series of pretreatments is started after the operation of replenishing a pretreatment container, it is possible to input the number of pretreatment containers held by the container holding unit after the replenishment. This allows the number of pretreatment containers usable in a series of pretreatments to be kept track of in the pretreatment device, so that a suitable treatment can be performed depending on its number.

The pretreatment device may further include a notification processing unit for notifying that the number of pretreatment containers of which the input is received by the number of containers receiving unit is smaller than the number of pretreatment containers used in a series of pretreatments to be started by the pretreatment unit when it happens.

According to the configuration, in the case where the number of usable pretreatment containers is smaller than that of the pretreatment containers used in an actual series of pretreatments, such a case is notified. This allows an analyst who confirmed the notification to perform the operation of replenishing a pretreatment container, so that it is possible to prevent a series of pretreatments from being started while the number of pretreatment containers to be used remains insufficient.

The analysis system according to the present invention includes the pretreatment device, an analyzer, and a control unit. The analyzer allows introduction of a sample pretreated in the pretreatment device. The control unit automatically controls the pretreatment device and the analyzer in coordination with each other.

Effects of the Invention

According to the present invention, it is possible to start a series of pretreatments without performing the operation of replenishing a pretreatment container, so that the pretreatment may be started in a simple operation.

BRIEF DESCRIPTION OF THE DRAWINGS

FIG. 1 is a schematic front view showing a configuration example of an analysis system according to one embodiment of the present invention.

FIG. 2 is a plan view showing a configuration example of a pretreatment device.

FIG. 3A is a side view showing a configuration example of a separation container.

FIG. 3B is a plan view of the separation container shown in FIG. 3A.

FIG. 3C is a cross-sectional view showing a cross-section along A-A in FIG. 3B.

FIG. 4A is a side view showing a configuration example of a collection container.

FIG. 4B is a plan view of the collection container shown in FIG. 4A.

FIG. 4C is a cross-sectional view showing a cross-section along B-B in FIG. 4B.

FIG. 5 is a cross-sectional view showing a pretreatment kit in a state where the separation container and the collection container are piled up.

FIG. 6A is a plan view showing a configuration example of a filtration port.

FIG. 6B is a cross-sectional view showing a cross-section along X-X in FIG. 6A.

FIG. 6C is a cross-sectional view showing a cross-section along Y-Y in FIG. 6A.

FIG. 6D is a cross-sectional view showing a state where the pretreatment kit is installed in the filtration port.

FIG. 7 is a schematic view showing a configuration example of a negative pressure application mechanism.

FIG. 8 is a block diagram showing an example of an electric configuration of the analysis system.

FIG. 9A is a view showing an example of a device state screen displayed in an operation display unit.

FIG. 9B is a view showing an example of a screen displayed in the operation display unit when a start key is selected.

FIG. 10A is a flow chart for explaining by way of example, the operation of the pretreatment device.

FIG. 10B is a flow chart for explaining by way of example, the operation of the pretreatment device.

MODE FOR CARRYING OUT THE INVENTION

FIG. 1 is a schematic front view showing a configuration example of an analysis system according to one embodiment of the present invention. The analysis system includes a pretreatment device 1, a liquid chromatography device (LC) 100, and a mass spectrometry device (MS) 200, and performs analysis by sequentially introducing a sample which is pretreated by the pretreatment device 1 into the LC 100 and the MS 200. That is, the analysis system according to this embodiment is configured by connecting the liquid chromatography/mass spectrometry (LC/MS) devices to the pretreatment device 1. However, such a configuration is not restrictive, and the MS 200 may be omitted so that a sample pretreated by the pretreatment device 1 is introduced into only the LC 100 or into another analyzer.

The pretreatment device 1 performs various types of pretreatments such as sample dispensing, reagent dispensing, agitation, and filtration on a sample of biological origin, such as whole blood, blood serum, a dried blood spot, or urine. A sample extracted from such pretreatments is introduced into the LC 100 through an autosampler 101 provided to the LC 100. The LC 100 is provided with a column (not shown), and sample components separated in the process of the sample passing through the column are sequentially introduced into the MS 200. The MS 200 includes an ionizer 201 for ionizing a sample introduced from the LC 100, and a mass spectrometer 202 for analyzing an ionized sample.

The pretreatment device 1 is provided with an operation display unit 1a including, for example, a touch panel. An analyst is allowed to perform input regarding operation of the pretreatment device 1 by performing operation on a display screen of the operation display unit 1a, and is also allowed to check information about operation of the pretreatment device 1 displayed on the display screen of the operation display unit 1a. Additionally, the configuration where the operation display unit 1a of a touch panel is provided is not restrictive, and a display unit configured by a liquid crystal display, and an operation unit configured by operation keys or the like may be separately provided.

FIG. 2 is a plan view showing a configuration example of the pretreatment device 1. In the pretreatment device 1, one pretreatment kit including a set of a separation container 50 and a collection container 54 is used for each sample and pretreatment items (sample dispensing, reagent dispensing, agitation, filtration, etc.) set for each pretreatment kit are performed. The separation container 50 forms a pretreatment container into which a sample and a reagent are injected. The pretreatment device 1 is provided with a plurality of treatment ports for performing the pretreatment items. When the pretreatment kit containing a sample is placed in any of the treatment ports, the pretreatment items corresponding to the treatment port are to be performed on the sample contained in the pretreatment kit.

As the treatment ports, a filtration port 30, a dispensing port 32, a discard port 34, an agitation port 36a, temperature adjustment ports 38, 40, a transfer port 43, a washing port 45 and the like are provided in correspondence with the pretreatment items. These treatment ports form a plurality of pretreatment units for performing a plurality of types of pretreatments. The pretreatment items here are items of pretreatment necessary to analyze analysis items specified by an analyst.

The separation container 50 and the collection container 54 forming the pretreatment kit are transported between the treatment ports by a transport arm 24 as a transport unit. A holding unit 25 for holding the separation container 50 and the collection container 54 is formed on a tip end side of the transport arm 24. A base end portion side of the transport arm 24 is rotatably held around a vertical shaft 29. The transport arm 24 extends in a horizontal direction, and moves in such a way that the holding unit 25 draws an arch-shaped track on a horizontal plane when the transport arm 24 rotates around the vertical shaft 29. Each of the treatment ports and other ports, which are transport destinations of the separation container 50 and the collection container 54, are all provided on the arch-shaped track which is drawn by the holding unit 25.

A sample is dispensed into the pretreatment kit from a sample container 6. A plurality of sample containers 6 containing samples may be installed in a sample installation unit 2, and samples are sequentially collected from the sample containers 6 by a sampling arm 20 as a sampling unit. In the sample installation unit 2, a plurality of sample racks 4 for holding a plurality of sample containers 6 are installed next to one another in a circle. The sample installation unit 2 rotates on the horizontal plane to move the sample racks 4 in a circumferential direction. The sample containers 6 may thus be sequentially moved to a predetermined sampling position. The sampling position here is on the track of a sampling nozzle 20a provided at a tip end portion of the sampling arm 20, and a sample is collected from the sample container 6 by the sampling nozzle 20a at the sampling position.

The sampling arm 20 is capable of rotating on the horizontal plane, around a vertical shaft 22 provided on a base end portion side, and of moving up and down in a vertical direction along the vertical shaft 22. The sampling nozzle 20a is held at the tip end portion of the sampling arm 20, facing downward in the vertical direction, and moves according to operation of the sampling arm 20 so as to draw an arch-shaped track on the horizontal plane or to move up and down in the vertical direction.

The dispensing port 32 is provided on the track of the sampling nozzle 20a, at a position on the track of the holding unit 25 of the transport arm 24. The dispensing port 32 is a port for dispensing a sample into an unused separation container 50 from the sampling nozzle 20a. An unused separation container 50 is transported to the dispensing port 32 by the transport arm 24.

A reagent installation unit 8 for installing reagent containers 10 is provided at a center portion of the sample installation unit 2 where the sample racks 4 are arranged next to one another in a circle. A reagent in the reagent container 10 installed in the reagent installation unit 8 is collected by a reagent arm 26. The reagent arm 26 has its base end portion supported by the vertical shaft 29, which is common with that of the transport arm 24, and is capable of rotating on the horizontal plane around the vertical shaft 29, and of moving up and down in the vertical direction along the vertical shaft 29. A reagent addition nozzle 26a is held at a tip end portion of the reagent arm 26, facing downward in the vertical direction, and the reagent addition nozzle 26a moves according to operation of the reagent arm 26 so as to draw the same arch-shaped track as the holding unit 25 of the transport arm 24 on the horizontal plane or to move up and down in the vertical direction.

The reagent installation unit 8 is capable of rotating on the horizontal plane independently of the sample installation unit 2. A plurality of reagent containers 10 are arranged next to one another in a circle at the reagent installation unit 8, and each reagent container 10 moves in the circumferential direction when the reagent installation unit 8 is rotated. A desired reagent container 10 may thereby be moved to a predetermined reagent collection position. The reagent collection position is on the track of the reagent addition nozzle 26a provided at the tip end portion of the reagent arm 26, and a reagent is collected by the reagent addition nozzle 26a from the reagent container 10 at the reagent collection position. A reagent in the reagent container 10 is sucked into the reagent addition nozzle 26a, and is then dispensed into the separation container 50 installed at the dispensing port 32, and is thus added to the sample in the separation container 50.

The separation container 50 and the collection container 54 are held by a container holding unit 12 provided at a different position from the sample installation unit 2 and the reagent installation unit 8. In the container holding unit 12, a plurality of pretreatment kits, each of which is a set of unused separation container 50 and collection container 54 that are piled up, are held at a plurality (48 positions as the example of FIG. 2) of holding positions 53 that are arranged next to one another in a circle. The container holding unit 12 is provided with a rotating unit 14 which rotates on the horizontal plane, and a plurality of container racks 16 which are detachably mounted to the rotating unit 14.

Each container rack 16 is capable of holding a plurality of pretreatment kits. The plurality of container racks 16 are arranged next to one another in a circle on the rotating unit 14. An annular holding region for holding a plurality of pretreatment kits is formed by the plurality of container racks 16 arranged next to one another in a circle. The rotating unit 14 rotates on the horizontal plane to thereby shift each container rack 16 in the circumferential direction of the holding region. A plurality of pretreatment kits may thereby be sequentially moved to a predetermined transport position. The transport position here is on the track of the holding unit 25 provided at the tip end portion of the transport arm 24, and the separation container 50 or the collection container 54 is held by the holding unit 25 at the transport position to be transported to a transport destination port.

That is, the pretreatment kits (the separation containers 50 or the collection containers 54) that are held at the holding positions 53 in the container holding unit 12 are transported out of the transport positions in a specific order and then used, to thereby sequentially perform pretreatment. The above specific order is not particularly limited, and for example, the order of the plurality of container racks 16 is determined and the order of the plurality of holding positions 53 in the container racks 16 is also determined. Therefore, after the pretreatment kits held at all the holding positions 53 in one of the container racks 16 are transported out, the pretreatment kits held at the holding positions 53 in the next container rack 16 are sequentially transported out. The holding positions 53 are numbered and displayed according to the above specific order, though not shown in FIG. 2.

By dividing and holding the pretreatment kits by a plurality of container racks 16 in this manner, each container rack 16 is allowed to be individually mounted to or dismounted from the rotating unit 14. Accordingly, even while treatment is performed on the separation container 50 or the collection container 54 which is held by one of the container racks 16, other container racks 16 may be mounted or dismounted and other tasks may be performed, and thus, the pretreatment efficiency may be increased.

Additionally, the separation container 50 and the collection container 54 do not necessarily have to be held by the container holding unit 12 through the container rack 16, and may alternatively be held directly by the container holding unit 12, for example. Also, the separation container 50 and the collection container 54 do not necessarily have to be held by the container holding unit 12 in a state where they are piled up, and the separation container 50 and the collection container 54 may alternatively be held separately from each other. Moreover, the plurality of container racks 16 do not necessarily have to be arranged next to one another in a circle, and may alternatively be arranged next to one another in an arch, for example. In this case, a plurality of separation containers 50 and collection containers 54 are held in an arch-shaped holding region instead of an annular holding region.

An analyst may install, at the container holding unit 12, a plurality of types (for example, two types) of separation containers 50 with separating layers of different separation performances. These separation containers 50 are used according to the sample analysis items, and a separation container 50 corresponding to the analysis item specified by the analyst is selected and transported from the container holding unit 12. The analysis item here is the type of analysis which is to be sequentially performed using a sample which has been subjected to pretreatment by the pretreatment device 1, and is the type of analysis to be performed by the LC 100 or the MS 200, for example.

FIG. 3A is a side view showing a configuration example of the separation container 50. FIG. 3B is a plan view of the separation container 50 shown in FIG. 3A. FIG. 3C is a cross-sectional view showing a cross-section along A-A in FIG. 3B. FIG. 4A is a side view showing a configuration example of the collection container 54. FIG. 4B is a plan view of the collection container 54 shown in FIG. 4A. FIG. 4C is a cross-sectional view showing a cross-section along B-B in FIG. 4B. FIG. 5 is a cross-sectional view showing a pretreatment kit in a state where the separation container 50 and the collection container 54 are piled up.

As shown in FIGS. 3A to 3C, the separation container 50 is a cylindrical container having an inner space 50a for containing a sample or a reagent. A separating layer 52 is provided at a bottom portion of the inner space 50a. The separating layer 52 is a separating agent or a separating film having a function of selectively separating a specific component in a sample by letting a sample pass through and by physically or chemically reacting with the specific component, for example.

As the separating agent forming the separating layer 52, ion exchange resin, silica gel, cellulose, or activated carbon may be used, for example. Also, as the separating film, a polytetrafluoroethylene (PTFE) film, a nylon film, a polypropylene film, a polyvinylidene difluoride (PVDF) film, an acrylic copolymer film, a mixed cellulose film, a nitrocellulose film, a polyether sulfone film, an ion exchange film, or a glass fiber film may be used, for example.

As a deproteinization filter (separating film) for removing protein in a sample by filtration, a PTFE or acrylic copolymer film may be used, for example. In this case, to prevent clogging of the deproteinization filter, a pre-filter (not shown) may be provided on an upper side of the separating layer 52. As the pre-filter, a nylon film, a polypropylene film, or a glass fiber film may be used, for example. The pre-filter is for removing insoluble substances and foreign substances with relatively large particle diameters from a sample. The deproteinization filter may be prevented, by this pre-filter, from being clogged with insoluble substances and foreign substances with relatively large particle diameters.

An opening 50b for injecting a sample or a reagent is formed at an upper surface of the separation container 50. Also, an extraction opening 50d for extracting a sample which has passed through the separating layer 52 is formed at a lower surface of the separation container 50. A flange unit 50c for engaging with the holding unit 25 of the transport arm 24 is formed at an upper portion of an outer circumferential surface of the separation container 50 so as to protrude in the circumferential direction.

A skirt unit 51 which contacts the edge of the filtration port 30 when the separation container 50 is accommodated, together with the collection container 54, in the filtration port 30 is provided at a center portion of the outer circumferential surface of the separation container 50. The skirt unit 51 is formed to have an L shape in cross-section, and protrudes in the circumferential direction from the outer circumferential surface of the separation container 50 and extends downward, and thereby forms a certain space to the outer circumferential surface of the separation container 50.

As shown in FIGS. 4A to 4C and FIG. 5, the collection container 54 is a cylindrical container for accommodating a lower portion of the separation container 50, and for collecting an extracted sample from the extraction opening 50d of the separation container 50. An opening 54b for inserting the lower portion of the separation container 50 is formed to an upper surface of the collection container 54. An inner space 54a for accommodating a part of the separation container 50 lower than the skirt unit 51 is formed inside the collection container 54. As with the separation container 50, a flange unit 54c for engaging with the holding unit 25 of the transport arm 24 is formed at an upper portion of an outer circumferential surface of the collection container 54 so as to protrude in the circumferential direction.

As shown in FIG. 5, in a state where the separation container 50 and the collection container 54 are piled up, the upper portion of the collection container 54 is placed inside the skirt unit 51. The outer diameter of the separation container 50 is smaller than the inner diameter of the collection container 54. Accordingly, a small gap is formed between the outer circumferential surface of the separation container 50 accommodated in the inner space 54a of the collection container 54 and the inner circumferential surface of the collection container 54. The separation container 50 and the collection container 54 are installed in the container holding unit 12 with the lower portion of the separation container 50 accommodated inside the collection container 54 (the state shown in FIG. 5).

Three cutouts 54d are formed to the edge of the upper surface of the collection container 54. Accordingly, when the separation container 50 and the collection container 54 are piled up as shown in FIG. 5, the inside and the outside of the collection container 54 may be communicated through the cutouts 54 even in a state where the upper surface of the collection container 54 is in contact with the inner surface of the skirt unit 51. Additionally, the number of cutouts 54d is not limited to three, and it may be two or less, or four or more. Also, a small hole may be formed instead of the cutout 54d.

Referring back to FIG. 2, the filtration ports 30 are provided on the inside the container holding unit 12. That is, an annular or arch-shaped holding region is formed by the plurality of container racks 16 arranged next to one another on the outer circumference of the filtration ports 30, and a plurality of separation containers 50 and collection containers 54 are held in the holding region. In this manner, because the holding region of the separation containers 50 and the collection containers 54 is formed into an annular or arch shape, and an installation space for the filtration ports 30 is secured in a vacant space at the center portion of the holding region, a more compact structure may be achieved.

Particularly, in the present embodiment, because the separation container 50 and the collection container 54 are held in the holding region in a state where they are piled up, separate holding regions do not have to be provided for the separation container 50 and the collection container 54. Therefore, a greater number of separation containers 50 and collection containers 54 may be held in a small holding region. Accordingly, the holding region for the separation containers 50 and the collection containers 54 may be made even smaller, and a more compact structure may be achieved.

Furthermore, by providing the filtration ports 30 at the center portion of the holding region which is formed into an annular or arch shape, the distances between the plurality of separation containers 50 and collection containers 54 held in the holding region and the filtration ports 30 may be made relatively small. Accordingly, the time required to transport the separation container 50 and the collection container 54 to the filtration port 30 may be reduced, and the pretreatment efficiency may be increased.

The filtration port 30 forms a filtration unit for separating a sample by the separating layer 52 by applying pressure to a sample in the separation container 50. In the present embodiment, two filtration ports 30 are provided next to each other on the track of the holding unit 25 of the transport arm 24, for example. The separation container 50 and the collection container 54 are installed in each filtration port 30 in a state where they are piled up as shown in FIG. 5, and a sample separated by the separating layer 52 in the separation container 50 by a negative pressure is collected by the collection container 54. Additionally, the separation container 50 and the collection container 54 do not necessarily have to be installed in the filtration port 30 in a state where they are piled up, and the separation container 50 and the collection container 54 may alternatively be installed separately. Also, the number of the filtration ports 30 is not limited to two, and it may be one or three or more.

Three agitation ports 36a are provided to an agitation unit 36 provided near the container holding unit 12, next to one another on the track of the holding unit 25 of the transport arm 24, for example. The agitation unit 36 has a mechanism for periodically and separately operating each of the agitation ports 36a on the horizontal plane. A sample in the separation container 50 disposed in each agitation port 36a may by agitated by such a mechanism. Additionally, the number of the agitation ports 36a is not limited to three, and it may be two or less, or four or more.

The temperature adjustment ports 38, 40 are provided to a thermally conductive block temperature of which is controlled by a heater and a Peltier device, for example, and the temperature of the separation container 50 or the collection container 54 accommodated in the temperature adjustment ports 38, 40 is adjusted to a certain temperature. The temperature adjustment port 38 is for the separation container 50, and four temperature adjustment ports 38 are arranged next to one another on the track of the holding unit 25 of the transport arm 24, for example. The temperature adjustment port 40 is for the collection container 54, and like the temperature adjustment ports 38 for the separation containers 50, four temperature adjustment ports 40 are arranged next to one another on the track of the holding unit 25 of the transport arm 24, for example. Additionally, the number of the temperature adjustment ports 38, 40 is not limited to four, and it may be three or less, or five or more.

FIG. 6A is a plan view showing a configuration example of the filtration port 30. FIG. 6B is a cross-sectional view showing a cross-section along X-X in FIG. 6A. FIG. 6C is a cross-sectional view showing a cross-section along Y-Y in FIG. 6A. FIG. 6D is a cross-sectional view showing a state where the pretreatment kit is installed in the filtration port 30.

The filtration port 30 is formed as a recess, for example, and the recess forms an installation space 30a for installing the pretreatment kit. That is, as shown in FIG. 6D, the separation container 50 and the collection container 54 transported by the transport arm 24 from the container holding unit 12 are installed in the installation space 30a in a state where they are piled up. At this time, the collection container 54 is accommodated first in the installation space 30a, and then, the lower portion of the separation container 50 is accommodated in the inner space 54a of the collection container 54.

A holding member 31 for sandwiching and holding the collection container 54 is provided inside the filtration port 30. The holding member 31 is a U-shaped metal member which is open at the top, for example, and two arm units extending upward form two leaf springs which are capable of elastically shifting in an inner diameter direction of the filtration port 30. The two leaf spring portions of the holding member 31 are curved or bent inward in such a way that the gap between the two is the smallest at a part between upper end portions and lower end portions, for example. The gap between the two leaf spring portions is greater than the outer diameter of the collection container 54 at the upper end portions and the lower end portions, and smaller than the outer diameter of the collection container 54 at the part where the gap is the smallest.

Due to the shape of the holding member 31 as described above, when the collection container 54 is inserted into the installation space 30a of the filtration port 30, the two leaf spring portions of the holding member 31 are opened as the collection container 54 is lowered, and the collection container 54 is held in the installation space 30a by the elastic force. The collection container 54 is equally pressed from two opposite directions by the two leaf spring portions of the holding member 31, and is held at a center portion of the installation space 30a. The holding member 31 is fixed inside the installation space 30a, and is prevented from being lifted together with the collection container 54 at the time of removal of the collection container 54.

A ring-shaped sealing member 60 having elasticity is provided at an edge of an opening at an upper surface of the filtration port 30. The sealing member 60 is fitted in a pit provided at the edge of the opening at the upper surface of the filtration port 30, for example. The material of the sealing member 60 is an elastic material such as silicone rubber or ethylene-propylene-diene rubber (EPDM), for example. When the collection container 54 and the separation container 50 are installed inside the installation space 30a of the filtration port 30, the lower end of the skirt unit 51 of the separation container 50 comes into contact with the sealing member 60, and the installation space 30a is sealed by the skirt unit 51. Additionally, the contact portion of the separation container 50 to the sealing member 60 does not necessarily have to be formed with a member having the shape of the skirt unit 51, and contact portions having various shapes, such as a flange, are allowed, for example.

A channel 56 for reducing pressure communicates with the installation space 30a from a bottom surface of the filtration port 30. A channel 57 of a negative pressure application mechanism 55 is connected to the channel 56. The negative pressure application mechanism 55 includes a vacuum pump, for example, and forms a negative pressure application unit which applies a negative pressure inside the installation space 30a. When the pressure inside the installation space 30a is reduced by the negative pressure application mechanism 55 in a state where the separation container 50 and the collection container 54 are accommodated in the filtration port 30, the pressure inside the installation space 30a becomes negative.

The inner space 54a of the collection container 54 communicates with the installation space 30a with negative pressure through the cutouts 54d of the collection container 54 and the gap between the inner circumferential surface of the collection container 54 and the outer circumferential surface of the separation container 50. The upper surface of the separation container 50 is open to the atmosphere, and thus, a pressure difference is caused between the inner space 50a of the separation container 50 and the inner space 54a of the collection container 54 across the separating layer 52. Accordingly, only the component, of a sample contained in the inner space 50a of the separation container 50, which can pass through the separating layer 52 is separated by the separating layer 52 by the pressure difference, and is extracted into the inner space 54a side of the collection container 54.

FIG. 7 is a schematic view showing a configuration example of the negative pressure application mechanism 55. Two filtration ports 30 are connected to a common vacuum tank 66. Each filtration port 30 and the vacuum tank 66 are connected by the channel 57, and a pressure sensor 62 and a three-way valve 64 are provided to each channel 57. The pressure inside the installation space 30a of each filtration port 30 is detected by the pressure sensor 62. Each three-way valve 64 is capable of switching to any one of a state where the filtration port 30 and the vacuum tank 66 are connected, a state where the channel 57 is open to the atmosphere on the side of the filtration port 30 (the state shown in FIG. 7), and a state where an end portion of the channel 57 on the side of the filtration port 30 is sealed.

A pressure sensor 68 is connected to the vacuum tank 66, and a vacuum pump 58 is also connected to the vacuum tank 66 through a three-way valve 70. Accordingly, by switching the three-way valve 70, the vacuum pump 58 may be connected to the vacuum tank 66 as necessary to adjust the pressure inside the vacuum tank 66.

When performing a sample extraction process at one of the filtration ports 30, the filtration port 30 and the vacuum tank 66 are connected, and the value of the pressure sensor 62 detecting the pressure inside the installation space 30a of the filtration port 30 is adjusted to be a predetermined value. Then, an end portion of the channel 57 on the side of the filtration port 30 is sealed. The installation space 30a of the filtration port 30 thereby becomes a sealed system, and extraction of a sample is performed by the inside of the installation space 30a being maintained in the reduced pressure state.

Referring back to FIG. 2, the pretreatment device 1 is provided with a sample transfer unit 42 for transferring a sample extracted into the collection container 54 to the autosampler 101 side. The sample transfer unit 42 includes a moving unit 44 which moves in one direction (an arrow direction in FIG. 2) on the horizontal plane, and a transfer port 43 for installing the collection container 54 is provided on an upper surface of the moving unit 44. The moving unit 44 moves by operation of a drive mechanism including a rack and pinion mechanism, for example.

While a sample is not transferred to the autosampler 101 side, the transfer port 43 is arranged on the track of the holding unit 25 of the transport arm 24 (the position shown by a solid line in FIG. 2). Installation of the collection container 54 in the transfer port 43 by the transport arm 24, and collection of the collection container 54 from the transfer port 43 are performed in this state.

At the time of transfer of a sample to the autosampler 101 side, the collection container 54 containing the extracted sample is installed in the transfer port 43, and then, the moving unit 44 moves in an outward direction of the pretreatment device 1, and the transfer port 43 is arranged at a position adjacent to the autosampler 101 (the position shown by a broken line in FIG. 2). The sample inside the collection container 54 is sucked in, in this state, by a nozzle for sampling provided to the autosampler 101.

When suction of the sample by the autosampler 101 is ended, the moving unit 44 is returned to the original position (the position shown by the solid line in FIG. 2), and the collection container 54 is collected by the transport arm 24. The used collection container 54 is transported to the discard port 34 by the transport arm 24, and is discarded. The discard port 34 is arranged near the dispensing port 32, on the track of the holding unit 25 of the transport arm 24, and used separation containers 50 and collection containers 54 are discarded.

The washing port 45 for washing the sampling nozzle 20a is provided on the track of the sampling nozzle 20a. Additionally, although not shown, a washing port for washing the reagent addition nozzle 26a is provided on the track of the reagent addition nozzle 26a.

FIG. 8 is a block diagram showing an example of an electric configuration of the analysis system. In the following description, a "port" means one of a plurality of types of ports where the separation container 50 or the collection container 54 is to be installed, such as the filtration port 30, the dispensing port 32, the agitation port 36a, the temperature adjustment port 38, 40, or the transfer port 43.

Operation of the operation display unit 1a, the sample installation unit 2, the reagent installation unit 8, the container holding unit 12, the sampling arm 20, the transport arm 24, the reagent arm 26, the agitation unit 36, the sample transfer unit 42, and the negative pressure application mechanism 55 provided to the pretreatment device 1 is controlled by a control unit 84. The control unit 84 includes, for example, a central processing unit (CPU) and functions of pretreatment means 84a, treatment status management means 84b, random access means 84c, position setting receiving means 84d, the number of containers receiving means 84f, display control means 84g, and the like are realized by the CPU executing programs.

An arithmetic processing device 90 configured by a personal computer (PC) or a dedicated computer, for example, is connected to the control unit 84, and an analyst may manage the pretreatment device 1 by the arithmetic processing device 90. The LC 100 and the MS 200 where a sample which has been subjected to pretreatment by the pretreatment device 1 is introduced, the autosampler 101 for injecting a sample into the LC 100, and the like are connected to the arithmetic processing device 90, in addition to the pretreatment device 1, and these devices may be automatically controlled in coordination with one another by the arithmetic processing device 90.

As described above, a plurality of sample containers are installed in the sample installation unit 2, and samples contained in these sample containers are sequentially dispensed into the separation containers 50, and the separation containers 50 are transported to ports corresponding to the pretreatment items to be performed on the samples. The pretreatment means 84a performs a predetermined treatment corresponding to the port when the separation container 50 or the collection container 54 is installed in each port.

The random access means 84c checks the status of pretreatment at each port, and controls the operation of the transport arm 24 so that the separation container 50 pretreatment of which at a port is completed is transported to a port where next pretreatment is to be performed. That is, the random access means 84c checks the pretreatment items to be performed next on each sample, checks the vacancy status of the port corresponding to the pretreatment item, and if there is vacancy, the separation container 50 or the collection container 54 containing the sample is transported to the port. Also, if the port corresponding to the pretreatment item to be performed next on a sample is not vacant, the random access means 84c causes the target separation container 50 or the collection container 54 to be transported to the port as soon as the port becomes vacant.

The treatment status management means 84b manages the vacancy status of each port and the treatment status at each port. The vacancy status of each port may be managed by memorizing the port where the separation container 50 or the collection container 54 was installed. Moreover, a sensor for detecting whether the separation container 50 or the collection container 54 is installed in each port or not may be provided, and the vacancy status of each port may be managed based on a signal from the sensor.

The treatment status at each port may be managed based on whether a time required for pretreatment which is being performed at a port has passed since installation of the separation container 50 or the collection container 54 in the port. The status of treatment at the transfer port 43 (suction of a sample by the autosampler 101) may be managed based on whether a signal indicating that sample suction has ended is received from the autosampler 101 side or not.

Now, there are provided two filtration ports 30, three agitation ports 36a, four temperature adjustment ports 38, and four temperature adjustment ports 40, and ports which carry out the same pretreatment are prioritized, and the random access means 84c is configured to use ports from one with the highest priority. For example, at the time of performing filtration of a sample, if both of the two filtration ports 30 are vacant, the collection container 54 is installed in the filtration port 30 with higher priority, and the separation container 50 is installed on the collection container 54.

At the time of analysis of a sample, an analyst operates the operation display unit 1a and selects an analysis item for the sample. An analysis item is selected based on the name of a component which is the target of analysis by the LC 100 or the MS 200, for example. Moreover, an analyst may perform setting and selection of a pretreatment item which is necessary to perform a selected analysis item, by operating the operation display unit 1a. That is, setting may be performed such that one or a plurality of any pretreatment items are selected for a selected analysis item and be performed at the pretreatment device 1.

At this time, the number (the number scheduled for use) of separation containers 50 and the number (the number scheduled for use) of collection containers 54 both to be used for analysis are determined. The analyst replenishes a separation container 50 and a collection container 54 to the container holding unit 12 as required. In the example of FIG. 2, an analyst starts analysis in a state where the pretreatment kits (separation containers 50 and collection containers 54) are held at all the 48 holding positions 53 in the container holding unit 12, so that a series of pretreatments using up to 48 pretreatment kits can be sequentially performed.

In the present embodiment, by operating the operation display unit 1a, an analyst may set the holding position 53 of the pretreatment kit to be used first in the case of starting analysis (in the case of starting a series of pretreatments). When such an operation is performed, the position setting receiving means 84d functions as a position setting receiving unit which receives the setting of the holding position 53 of the pretreatment kit to be used first.

In addition, in the present embodiment, by operating the operation display unit 1a, an analyst may input the number of pretreatment kits held by the container holding unit 12. When such an operation is performed, the number of containers receiving means 84f functions as the number of containers receiving unit which receives the input of the number of pretreatment kits held by the container holding unit 12. As in the example of FIG. 2, in the case where the container holding unit 12 includes 48 holding positions 53, an analyst may input the number "48" as the number of pretreatment kits held by the container holding unit 12 so as to set in a state where the pretreatment kits are held at all of the holding positions 53.

The pretreatment means 84a, the treatment status management means 84b, and the random access means 84c are included in a pretreatment execution unit 84e. The pretreatment execution unit 84e controls the pretreatment unit formed by each port, the sampling arm 20, the transport arm 24, the reagent arm 26, and the like based on various settings including the setting received by the position setting receiving means 84d and the number of containers receiving means 84f. At this time, the pretreatment execution unit 84e performs control in such a way that a plurality of types of pretreatment set for different samples is performed simultaneously in parallel.

That is, the separation containers 50 or the collection containers 54 containing different samples are successively transported to respective ports corresponding to the plurality of types of pretreatment, and the samples are pretreated in parallel. The pretreatment execution unit 84e performs control, based on management by the treatment status management means 84b, in such a way that pretreatment is not to be performed on different samples at the same port at the same time. Additionally, in the case where a plurality of ports are provided for the same pretreatment, each port forms an individual pretreatment unit.

As described above, in the present embodiment, any separation containers 50 or collection containers 54 are sequentially transported by the transport arm 24 to a plurality of ports (pretreatment units), and pretreatment may be performed at the ports simultaneously in parallel. Accordingly, even if pretreatment of a sample takes much time, pretreatment of other samples can proceed forward, thereby preventing a wasteful waiting time.

Moreover, a plurality of types of pretreatment and a parameter for each pretreatment may be set for each sample, and thus, a wide variety of types of pretreatment may be performed on each sample. Also in such a case, any separation containers 50 or collection containers 54 may be sequentially transported by the transport arm 24 to a plurality of ports and pretreatment may be performed. Further, because control is performed in such a way that pretreatment is not to be performed on different samples at the same port at the same time, not only a high degree of flexibility in setting of pretreatment may be achieved but also the pretreatment efficiency may be increased.

The display control means 84g functions as a display control unit for controlling the display of the operation display unit 1a. The control of the display control means 84g allows the operation display unit 1a to switch and display various display screens. In the present embodiment, a device state screen for displaying information about the operation of the pretreatment device 1, a condition setting screen for receiving condition settings, and the like are displayed in the operation display unit 1a by the control of the display control means 84g. The details of the setting received by the position setting receiving means 84d and the number of containers receiving means 84f are also displayed on the operation display unit 1a by the control of the display control means 84g.

The position information storage unit 86 is connected to the control unit 84. The position information storage unit 86 is configured by a hard disk or a random access memory (RAM), for example, and stores information about the holding position 53 of the pretreatment kit. Specifically, when the analysis is completed (when a series of pretreatments is completed), the holding position 53 of the pretreatment kit used last may be stored in the position information storage unit 86.

FIG. 9A is a view showing an example of the device state screen 300 displayed in the operation display unit 1a. The device state screen 300 is a screen for displaying information about the operation of the pretreatment device 1, and in this example, the performance status of pretreatment on a sample in the pretreatment device 1 is displayed. Specifically, a symbol image 301 indicating the sample installation unit 2 of the pretreatment device 1 is displayed, in which the performance status of pretreatment on a sample in each sample container 6 may be displayed in correspondence with the holding positions of the sample containers 6 in the sample installation unit 2.

In the same manner as the actual sample installation unit 2, the symbol image 301 is divided into a plurality of arc-shaped regions in correspondence with the plurality of sample racks 4 set next to one another in a circle, and a plurality of switching regions 302 corresponding to the sample containers 6 are provided in the respective arc-shaped regions. By switching display modes (e.g., color) of these switching regions 302 corresponding to the respective sample containers 6, the performance status of pretreatment on a sample in each sample container 6 may be displayed according to the display mode.

Although the above embodiment has described about a configuration such that eight sample containers 6 are held by each sample rack 4, FIG. 9A shows the case where ten sample containers 6 are held by each sample rack 4. As described above, the number of sample containers 6 held by each sample rack 4 may be set to any number. The sample installation unit 2 does not necessarily have to be divided into a plurality of sample racks 4 to install the sample containers 6.

Examples of the performance status of pretreatment on a sample include "standby" indicating that pretreatment is not yet performed; "analyzing" indicating that pretreatment has been started but an analysis result is not yet obtained; "normal end" indicating that analysis data is normally obtained; "abnormal end" indicating that something abnormal occurs during the pretreatment or during the analysis; and "data error" indicating that the obtained analysis data is abnormal. In this example, the switching regions 302 corresponding to ten sample containers 6 are switched to the display mode of "standby", the switching regions 302 corresponding to two sample containers 6 are switched to the display mode of "analyzing", the switching region 302 corresponding to one sample container 6 is switched to the display mode of "data error".

The operation state of the pretreatment device 1 is displayed at the center portion of the symbol image 301. In this example, "analyzing" is displayed because the pretreatment device 1 is in operation. For example, while the pretreatment device 1 is suspended, "suspended" is displayed. A pretreatment step display region 303 for displaying the pretreatment step already performed with the analyzing samples is provided above the symbol image 301.

In the present embodiment, a pretreatment information display region 304 for displaying information about the operation of the pretreatment device 1, an LC information display region 305 for displaying information about the operation of LC 100, and an MS information display region 306 for displaying information about the operation of MS 200 and the like are provided on a portion of the device state screen 300.

Examples of the information displayed in the pretreatment information display region 304 may include a connection state 341 of the pretreatment device 1 to the arithmetic processing device 90, a pressure 342 in the filtration port 30, the number (remaining number or number scheduled for use) of sets 343 of the separation container 50 and the collection container 54, a temperature 344 in each unit (cooling unit or temperature adjustment port 38, 40 of a reagent) of the pretreatment device 1, a state 345 of a pure water tank for storing water to be used during washing or dispensing, a state 346 of a pump for degassing water to be used during washing or dispensing, a state 347 of a waste liquid tank for wasting water used during washing, a state 348 of a discard box for discarding the used separation container 50 and the used collection container 54, a state 349 of a pump for delivering water to be used during washing or dispensing, and the like. At least one of these information may be displayed in the pretreatment information display region 304, or other various kinds of parameters set as conditions at the time of operating the pretreatment device 1 or other unit states in the pretreatment device 1 may be displayed.

Examples of the information displayed on the LC information display region 305 may include a connection state 351 of the LC 100 to the arithmetic processing device 90, a pressure 352 of a pump for feeding a sample and a mobile phase to a column, a temperature 353 of an oven for heating the column, and the like. In the LC information display region 305, at least one of these information may be displayed, or other various kinds of parameters set as conditions at the time of operating the LC 100 or other unit states in the LC 100 may be displayed. For example, a needle descending stroke of an autosampler, a sample suction speed, a needle washing time, a flow rate of a mobile phase with a pump, a mixing ratio of the mobile phase, upper-limit set temperature of a column oven, and the like in the LC 100 may be displayed in the LC information display region 305. Among the above information, as parameters that significantly affect the analysis data, a pressure and a flow rate of a mobile phase with a pump, and an oven temperature are preferably displayed.

Examples of the information displayed on the MS information display region 306 may include a connection state 361 of the MS 200 to the arithmetic processing device 90, a flow rate 362 of a gas to be used in the MS 200, a temperature 363 in each unit of the MS 200, a vacuum degree 364 in each unit of the MS 200, and the like. In the MS information display region 306, at least one of these information may be displayed or other various kinds of parameters set as conditions at the time of operating the MS 200 or other unit states in the MS 200 may be displayed. For example, a nebulizer gas flow rate, a drying gas flow rate, an interface voltage/current, a DL (desolvating tube) temperature, a heat block temperature, a voltage of a detector, a vacuum degree in each vacuum chamber, CID gas pressure, and the like in the MS 200 may be displayed in the MS information display region 306. Among the above information, as parameters that significantly affect the analysis data, a nebulizer gas flow rate, a drying gas flow rate, a DL temperature, a heat block temperature, and a vacuum degree are preferably displayed.

Abnormal display regions 340, 350, 360 for displaying abnormal information are provided in at least one of the pretreatment information display region 304, the LC information display region 305, and the MS information display region 306. In the pretreatment information display region 304, the abnormal display region 340 is provided in correspondence with, for example, the connection state 341 of the pretreatment device 1 to the arithmetic processing device 90, the state 345 of the pure water tank for storing water to be used during washing or dispensing, the state 346 of the pump for degassing water to be used during washing or dispensing, the state 347 of the waste liquid tank for wasting water used during washing, the state 348 of the discard box for discarding the used separation container 50 and the used collection container 54, the state 349 of the pump for delivering water to be used during washing or dispensing, and the like. In the LC information display region 305, the abnormal display region 350 is provided in correspondence with, for example, the connection state 351 of the LC 100 to the arithmetic processing device 90. In the MS information display region 306, the abnormal display region 360 is provided in correspondence with, for example, the connection state 361 of the MS 200 to the arithmetic processing device 90.

The abnormal display regions 340, 350, 360 are for, in the case where a corresponding state is abnormal, displaying its abnormal information and indicate abnormality, for example, by using a color different from one used in the case where the state is normal. Additionally, the LC 100 or MS 200 state about which abnormal information is displayed by the abnormal display region 350, 360 is not limited to the connection state 351, 361, and may be displayed as abnormalities about other various types of states. Abnormal information in the abnormal display regions 340, 350, 360 does not necessarily have to be indicated by switching colors, and may be indicated by other various modes such as by switching lighting-up or blinking.

On a portion (e.g., the top) of the device state screen 300, a start key 307 selected to start analysis, a pause key 308 selected to pause the analysis, an alarm for stop key 309 selected in emergency to give an alarm for emergency stop, and also a switch screen key 310 selected to switch the display of the operation display unit 1a from the device state screen 300 to the condition setting screen are displayed. An analyst selects an analysis method registered in advance and then selects the start key 307, to thereby allow analysis to be easily started by instructions from the pretreatment device 1.

FIG. 9B is a view showing an example of a screen displayed in the operation display unit 1a when the start key 307 is selected.

On the screen shown in FIG. 9B, the holding position 53 of the pretreatment kit to be used first among the plurality of holding positions 53 in the container holding unit 12 may be set, and after the setting, a START key 370 is selected, to thereby allow analysis to be started with the pretreatment kit at the set holding position 53 being used first. The screen shown in FIG. 9B includes, in addition to the above-mentioned START key 370, the number of containers input region 371, a container supply setting region 372, a next use position display region 373, a number scheduled for use display region 374, and the like.

The number of pretreatment kits held by the container holding unit 12 is input in the number of containers input region 371. As in the example of FIG. 9A, in the case of a configuration where 60 sample containers 6 may be installed in the sample installation unit 2, 60 pretreatment kits which are equal to the number of sample containers 6 may be held by the container holding unit 12. In the case where at the time of starting analysis, an analyst replenishes a pretreatment kit to the container holding unit 12 to set in a state where the pretreatment kits are held at all the holding positions 53, the analyst may input "60", which is the number of all the holding positions 53, in the number of containers input region 371.

A checkbox 375 for selecting a specific holding position 53 determined in advance as a forwardmost holding position 53a (see FIG. 2) is included in the container supply setting region 372. When the checkbox 375 is selected, the holding position 53 of the pretreatment kit to be used first is determined as the forwardmost holding position 53a. In contrast, when the checkbox 375 is not selected, the subsequent holding position 53 in the specific order described above is determined as the holding position 53 of the pretreatment kit to be used first, based on the holding position 53 of the pretreatment kit used last at the time of the previous analysis stored in the position information storage unit 86.

That is, in the case where the START key 370 is selected while the checkbox 375 is selected, the position setting receiving means 84d receives the setting in which a specific holding position 53 (forwardmost holding position 53a) among a plurality of holding positions 53 is determined as the holding position 53 of the pretreatment kit to be used first. In contrast, in the case where the START key 370 is selected while the checkbox 375 is not selected, the position setting receiving means 84d receives the setting of the holding position 53 of the pretreatment kit to be used first, based on the information stored in the position information storage unit 86. Additionally, any holding position 53 may be set as the holding position 53 of the pretreatment kit to be used first.

When the screen shown in FIG. 9B is first displayed by selecting the start key 307 on the device state screen 300 shown in FIG. 9A, the checkbox 375 is not being selected. Therefore, in the case where the START key 370 is selected without selecting the checkbox 375 as is, the holding position 53 of the pretreatment kit to be used first is determined based on the information stored in the position information storage unit 86.

Usually, in the case where at the time of starting analysis, an analyst replenishes a pretreatment kit to the container holding unit 12 to set in a state where the pretreatment kits are held at all the holding positions 53, the analyst selects the checkbox 375 and then selects the START key 370. Accordingly, the pretreatment kits, in sequence beginning from one held at the forwardmost holding position 53a, are transported out from the container holding unit 12 and pretreatment is performed.

In the case where all the pretreatment kits have not been used in one analysis, the START key 370 may be selected without selecting the checkbox 375 at the start of the next analysis. In this case, the number of remaining pretreatment kits is calculated and displayed in the number of containers input region 371, and the analyst may input the number displayed in the number of containers input region 371 as the number of pretreatment kits held by the container holding unit 12 by selecting only the START key 370 without performing any setting operation on the number of containers input region 371.

The holding position 53 of the pretreatment kit to be used first when the START key 370 is selected to start analysis is displayed in the next use position display region 373. Therefore, in the case where the checkbox 375 in the container supply setting region 372 is selected, "1" is displayed in the next use position display region 373. In contrast, in the case where the checkbox 375 is not being selected, the number corresponding to the holding position 53 of the pretreatment kit to be used first is displayed, based on the information stored in the position information storage unit 86.

The number of pretreatment kits that are scheduled to be used when the START key 370 is selected to start analysis is displayed in the number scheduled for use display region 374. The number displayed in the number scheduled for use display region 374 needs to be not more than the number displayed in the number of containers input region 371. However, in the case where analysis is started without replenishing a pretreatment kit, the number displayed in the number of containers input region 371 is sometimes smaller than the number displayed in the number scheduled for use display region 374.

In this manner, in the case where the number (the number displayed in the number of containers input region 371) of pretreatment kits the input of which is received by the number of containers receiving means 84f is smaller than the number (the number displayed in the number scheduled for use display region 374) of pretreatment kits used in a series of pretreatments that is started when the START key 370 is selected, such a case is notified to the analyst by displaying in the operation display unit 1a. In this case, the display control means 84g functions as the notification processing unit for notifying the above case.

In the present embodiment, in the case where a series of pretreatments using a plurality of pretreatment kits is started, the pretreatment kit held at a specific holding position 53 (e.g., forwardmost holding position 53a) among the plurality of holding positions 53 is not restrictive, and a pretreatment kit held at the other holding position 53 may be used first to perform a series of pretreatments. Therefore, by setting the holding position 53 where the pretreatment kit is held as a holding position of the pretreatment kit to be used first, a series of pretreatments is allowed to be started without performing the operation of replenishing a pretreatment kit. Accordingly, the pretreatment may be started in a simple operation.

In particular, in the case where a series of pretreatments using a plurality of pretreatment kits is started, if the checkbox 375 in the container supply setting region 372 is not selected, the holding position 53 (e.g., a holding position 53 subsequent to the holding position 53 of the pretreatment kit used last) where the pretreatment kit is held is allowed to be automatically set as a holding position 53 of the pretreatment kit to be used first, based on the information about the holding position 53 of the pretreatment kit used last during the previous pretreatment. Therefore, the pretreatment may be started in a simpler operation in cases, as for example where a series of pretreatments is started without performing the operation of replenishing a pretreatment kit.

In cases, as for example where a series of pretreatments is started after the operation of replenishing a pretreatment kit, if the checkbox 375 in the container supply setting region 372 is selected, a specific holding position 53 (e.g., forwardmost holding position 53a) among the plurality of holding positions 53 is allowed to be determined as the holding position 53 of the pretreatment kit to be used first. When a pretreatment kit is replenished, a pretreatment kit held at any of the holding positions 53 may be used first, so that the pretreatment kit held at a specific holding position 53 is used first to thereby simplify the operation during the pretreatment.

Further, in the present embodiment, in cases, as for example where a series of pretreatments is started after the operation of replenishing a pretreatment kit, the number of pretreatment kits held by the container holding unit 12 may be input in the number of containers input region 371 after the replenishment. This allows the number of pretreatment kits usable in a series of pretreatments to be kept track of in the pretreatment device 1, so that a suitable treatment may be performed depending on its number.

In the case where the number of usable pretreatment kits input in the number of containers input region 371 is smaller than that of the pretreatment kits used in an actual series of pretreatments displayed in the number scheduled for use display region 374, such a case is notified. This allows an analyst who confirmed the notification to perform the operation of replenishing a pretreatment kit, so that it is possible to prevent a series of pretreatments from being started while the number of pretreatment kits to be used remains insufficient.

FIGS. 10A and 10B are flow charts for explaining by way of example, the operation of the pretreatment device 1. In FIGS. 10A and 10B, only the flow of pretreatment for one sample is shown, but the operation for the pretreatment is performed simultaneously in parallel with and independently of the pretreatment operation for other samples. That "pretreatment is performed simultaneously in parallel and independently" means that, even while pretreatment is performed for a sample at a port, the separation container 50 or the collection container 54 containing another sample is transported by the transport arm 24 to another port, and pretreatment of the sample is independently performed.

First, an analysis item specified by an analyst for a sample in advance is checked (step S1), and a pretreatment item necessary to analyze the analysis item is figured out. Then, whether the dispensing port 32 is vacant is checked. If the dispensing port 32 is vacant (Yes in step S2), an unused separation container 50 for containing the sample is taken out from the container holding unit 12 by the transport arm 24, and is installed in the dispensing port 32 (step S3). At this time, the separation container 50 and the collection container 54 are installed in the container holding unit 12 in a state where they are piled up (the state shown in FIG. 5), but the transport arm 24 holds only the separation container 50 at the top by the holding unit 25 and transports the separation container 50 to the dispensing port 32.

Then, the sample is dispensed by the sampling nozzle 20a into the separation container 50 in the dispensing port 32 (step S4). The sampling nozzle 20a which dispensed the sample into the separation container 50 is washed at the washing port 45 to be used for dispensing the next sample. A reagent according to the pretreatment to be performed on the sample is dispensed from the reagent container 10, by the reagent addition nozzle 26a, into the separation container 50 in which the sample has been dispensed (step S5). Additionally, the reagent may be dispensed into the separation container 50 before dispensing of the sample. Alternatively, a reagent dispensing port for dispensing a reagent may be provided at a position different from the dispensing port 32, and the separation container 50 may be transported by the transport arm 24 to the reagent dispensing port so that a reagent is dispensed at the reagent dispensing port.

After the sample and the reagent have been dispensed into the separation container 50 in the above manner, the vacancy status of the agitation ports 36a is checked (step S6). Then, if there is a vacant agitation port 36a (Yes in step S6), the separation container 50 in the dispensing port 32 is transported to the vacant agitation port 36a by the transport arm 24, and an agitation process is performed (step S7). This agitation process is performed for a specific time set in advance, and the sample and the reagent inside the separation container 50 are thereby mixed.

The vacancy status of the filtration ports 30 is checked during the agitation process (step S8). Then, if there is a vacant filtration port 30 (Yes in step S8), the collection container 54 is transported to the filtration port 30 by the transport arm 24 (step S9). The collection container 54 installed in the filtration port 30 at this time is the collection container 54 which is paired up with the separation container 50 where the sample is being agitated at the agitation port 36a, and is the collection container 54 which was installed in the container holding unit 12 in a state the collection container 54 being piled up with the separation container 50.

Additionally, a different separation container 50 or collection container 54 may be transported by the transport arm 24 during this agitation process.

When the agitation process at the agitation unit 36 is completed, the separation container 50 is transported by the transport arm 24 from the agitation port 36a to the filtration port 30, and the separation container 50 is installed on the collection container 54 inside the filtration port 30 as shown in FIG. 6D (step S10). At this time, the separation container 50 is pushed to the installation space 30a side by the transport arm 24 until the lower end of the skirt unit 51 of the separation container 50 becomes slightly lower (by about 0.1 mm, for example) than the upper surface of the sealing member 60 provided around the filtration port 30. The sealing member 60 is thus flattened by the lower end of the skirt unit 51, and the airtightness between the lower end of the skirt unit 51 and the sealing member 60 is increased.

Predetermined negative pressure is applied by the negative pressure application mechanism 55 to the installation space 30a of the filtration port 30 where the separation container 50 and the collection container 54 are installed. When a state where negative pressure is applied to the installation space 30a of the filtration port 30 is maintained for a specific period of time, the sample in the separation container 50 is filtered, and the sample is extracted into the collection container 54 (step S11). A different separation container 50 or collection container 54 may be transported by the transport arm 24 also during this filtration process.

Additionally, although not incorporated in this pretreatment operation, a temperature adjustment process for maintaining the sample in the separation container 50 at a specific temperature for a specific period of time is sometimes incorporated after the agitation process for the sample in the separation container 50. In this case, the vacancy status of the temperature adjustment ports 38 is checked after the agitation process is completed, and if there is a vacancy, the separation container 50 is transported to the vacant temperature adjustment port 38. Then, the separation container 50 in the temperature adjustment port 38 is transported to the filtration port 30 after a lapse of the specific period of time, and is installed on the collection container 54 in the filtration port 30.

When the filtration process of the sample is completed, the three-way valve 64 (see FIG. 7) is switched, and the inside of the installation space 30a of the filtration port 30 is caused to reach the atmospheric pressure. Then, the used separation container 50 is taken out of the filtration port 30 by the holding unit 25 of the transport arm 24, and is discarded into the discard port 34 (step S12).

Then, the vacancy status of the transfer port 43 is checked, and if the transfer port 43 is vacant (Yes in step S13), the collection container 54 in the filtration port 30 is transported by the transport arm 24 to the sample transfer unit 42, and is placed on the transfer port 43. Then, the moving unit 44 moves to the position on the side of the adjacent autosampler 101 (the position shown by the broken line in FIG. 2), and the collection container 54 is thereby transferred to the autosampler 101 side (step S14). On the autosampler 101 side, sample suction by the sampling nozzle is performed with respect to the collection container 54 transferred from the sample transfer unit 42.

The moving unit 44 is stopped at the position on the side of the autosampler 101 until sample suction by the autosampler 101 is completed, and when a signal indicating completion of sample suction is received from the autosampler 101 (Yes in step S15), the moving unit 44 is returned to the original position (the position indicated by the solid line in FIG. 2). When transfer of the sample is completed, the used collection container 54 is collected by the transport arm 24 from the transfer port 43, and is discarded into the discard port 34 (step S16).

Additionally, although not incorporated in this pretreatment operation, a temperature adjustment process for maintaining the sample extracted into the collection container 54 at a specific temperature for a specific period of time is sometimes incorporated after the filtration process for the sample. In this case, the vacancy status of the temperature adjustment ports 40 is checked, and if there is a vacancy, the collection container 54 is transported to the vacant temperature adjustment port 40. Then, the collection container 54 in the temperature adjustment port 40 is transported to the transfer port 43 after a lapse of the specific period of time, and transfer of the sample is performed.

In the embodiment described above, as shown in FIG. 2, a structure where the pretreatment kits are held in two rows by the container rack 16 is described. However, the container rack 16 may hold the pretreatment kits in one row, or in three or more rows. Moreover, the plurality of holding positions 53 do not necessarily have to be arranged next to one another in a circle, and may be arranged next to one another in an alternative mode such as in an arch or in a line, for example.

Moreover, the embodiment described above has a configuration according to which a sample in the separation container 50 is separated by reducing the pressure inside the installation space 30a of the filtration port 30 to a negative pressure level. However, such a configuration is not restrictive, and a sample in the separation container 50 may alternatively be separated by increasing the pressure inside the separation container 50.

The control unit 84 of the pretreatment device 1 and the arithmetic processing device 90 do not necessarily have to be provided separately, and operation of the entire analysis system may alternatively be controlled by one control unit. That is, the arithmetic processing device 90 is omitted, and information may be directly transmitted and received between the pretreatment device 1 and the LC 100 or the MS 200.

The pretreatment container into which a sample is injected does not necessarily have to be the separation container 50 which forms a pretreatment kit together with the collection container 54, and may alternatively be a separation container used singly or a container other than the separation container, for example. Moreover, the pretreatment container does not necessarily have to be used after being transported out from the holding position 53 in the container rack 16, and may alternatively be used in a state of being held at each holding position 53, for example.

DESCRIPTION OF REFERENCE SIGNS 1 pretreatment device
1a operation display unit
2 sample installation unit
4 sample rack
6 sample container
8 reagent installation unit
10 reagent container
12 container holding unit
14 rotating unit
16 container rack
20 sampling arm
20a sampling nozzle
24 transport arm
25 holding unit
26 reagent arm
26a reagent addition nozzle
30 filtration port
32 dispensing port
50 separation container
53 holding position
53a forwardmost holding position
54 collection container
84 control unit
84a pretreatment means
84b treatment status management means
84c random access means
84d position setting receiving means
84e pretreatment execution unit
84f number of containers receiving means
84g display control means
90 arithmetic processing device
100 liquid chromatography device (LC)
101 autosampler
200 mass spectrometry device (MS)
201 ionizer
202 mass spectrometer
370 START key
371 number of containers input region
372 container supply setting region
373 next use position display region
374 number scheduled for use display region
375 checkbox

The invention claimed is:

1. A pretreatment device for performing pretreatment on a sample, comprising:
   a container holding unit configured to hold pretreatment containers into which a sample is injected, at a plurality of holding positions;
   a pretreatment unit, containing at least one port, configured to pretreat the pretreatment containers held at the plurality of holding positions of the container holding unit in a specific order; and
   an operation display unit for setting for a specific holding position of the pretreatment unit to be used first in the case of starting analysis;
   a controller in communication with the container holding unit, the pretreatment unit, and a position information storage unit, configured to:
   receive a setting of the specific holding position of a pretreatment container to be used first among the plurality of holding positions in the case where a series of pretreatments using the plurality of pretreatment containers are started by the pretreatment unit;
   store, when a series of pretreatments by the pretreatment unit is completed, information about the specific holding position of the pretreatment container used last of the series of pretreatments; and
   determine the specific holding position of the pretreatment container that is to be used first, based on the information stored in the position information storage unit.

2. The pretreatment device according to claim 1, wherein the controller is further configured to receive input of the number of pretreatment containers held by the container holding unit.

3. The pretreatment device according to claim 2, wherein the controller is further configured to notify an operator when the number of pretreatment containers is smaller than the number of pretreatment containers used in a series of pretreatments to be started by the pretreatment unit when it happens.

4. An analysis system comprising:
- a pretreatment device according to claim 1;
- an analyzer configured to analyze a sample pretreated in the pretreatment device; and
- a control unit for automatically controlling the pretreatment device and the analyzer in coordination with each other.

5. The pretreatment device according to claim 4, wherein the analyzer is at least one of a mass spectrometer or a chromatographer.

\* \* \* \* \*